(12) United States Patent
Kang

(10) Patent No.: US 9,871,906 B2
(45) Date of Patent: Jan. 16, 2018

(54) METHOD AND APPARATUS FOR COMMUNICATING ADVERTISEMENT SIGNAL INCLUDING SHARED INFORMATION BETWEEN DEVICES IN WIRELESS COMMUNICATION SYSTEM

(71) Applicant: Samsung Electronics Co., Ltd., Suwon-si, Gyeonggi-do (KR)

(72) Inventor: Hyeon-Jin Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/016,773

(22) Filed: Feb. 5, 2016

(65) Prior Publication Data

US 2016/0234371 A1  Aug. 11, 2016

(30) Foreign Application Priority Data

Feb. 9, 2015 (KR) ........................ 10-2015-0019611
Mar. 27, 2015 (KR) ........................ 10-2015-0043424
May 29, 2015 (KR) ........................ 10-2015-0076023

(51) Int. Cl.
| | | |
|---|---|---|
| H04B 1/38 | (2015.01) | |
| H04M 1/725 | (2006.01) | |
| H04W 4/06 | (2009.01) | |
| H04W 4/00 | (2009.01) | |
| H04W 4/02 | (2009.01) | |
| H04W 8/00 | (2009.01) | |
| H04W 88/04 | (2009.01) | |

(52) U.S. Cl.
CPC ....... *H04M 1/72533* (2013.01); *H04W 4/008* (2013.01); *H04W 4/023* (2013.01); *H04W 4/06* (2013.01); *H04W 8/005* (2013.01); *H04W 88/04* (2013.01)

(58) Field of Classification Search
None
See application file for complete search history.

(56) References Cited

U.S. PATENT DOCUMENTS

| | | |
|---|---|---|
| 6,122,520 A | 9/2000 | Want et al. |
| 8,577,292 B2 | 11/2013 | Huibers |
| 2002/0109706 A1* | 8/2002 | Lincke ................ G06F 17/3089 715/700 |
| 2011/0002143 A1 | 1/2011 | Saarikko et al. |
| 2012/0010995 A1* | 1/2012 | Skirpa ................... G06F 3/0481 705/14.49 |
| 2013/0176107 A1 | 7/2013 | Dumas et al. |

OTHER PUBLICATIONS

Ackerman, "Finally: Automatic Sliding Doors Get Star Trek Intelligence", IEEE Spectrum, Jun. 12, 2014.

* cited by examiner

*Primary Examiner* — Idowu O Osifade
(74) *Attorney, Agent, or Firm* — Jefferson IP Law, LLP

(57) ABSTRACT

A method for transmitting information in an inter-terminal communication system is provided. The method includes obtaining any information by a terminal, determining whether the obtained information is shared information, and transmitting, when the obtained information is the shared information, an advertisement signal including the shared information to another terminal.

26 Claims, 16 Drawing Sheets

METHOD AND APPARATUS FOR COMMUNICATING ADVERTISEMENT SIGNAL INCLUDING SHARED INFORMATION BETWEEN DEVICES IN WIRELESS COMMUNICATION SYSTEM

CROSS-REFERENCE TO RELATED APPLICATION(S)

This application claims the benefit under 35 U.S.C. §119 (a) of a Korean patent application filed on Feb. 9, 2015 in the Korean Intellectual Property Office and assigned Serial number 10-2015-0019611, and of a Korean patent application filed on Mar. 27, 2015 in the Korean Intellectual Property Office and assigned Serial number 10-2015-0043424, and of a Korean patent application filed on May 29, 2015 in the Korean Intellectual Property Office and assigned Serial number 10-2015-0076023, the entire disclosure of each of which is hereby incorporated by reference.

TECHNICAL FIELD

The present disclosure relates to methods and apparatuses for communicating information between devices in wireless communication systems. More particularly, the present disclosure relates to a method and an apparatus for communicating information with minimized device power consumption upon communication between devices in a wireless communication system.

BACKGROUND

The internet is evolving from the human-centered connection network by which humans create and consume information to the internet of things (IoT) network by which information is communicated and processed between things or other distributed components. Another arising technology is the internet of everything (IoE), which is a combination of the Big data processing technology and the IoT technology through, e.g., a connection with a cloud server. To implement the IoT, technology elements, such as a detection technology, wired/wireless communication and network infra, service interface technology, and a security technology, are required. There is a recent ongoing research for inter-object connection technologies, such as the sensor network, machine-to-machine (M2M), the machine-type communication (MTC), and the like.

In the IoT environment may be offered intelligent internet technology (IT) services that collect and analyze the data generated by the things connected with one another to create human life a new value. The IoT may have various applications, such as the smart home, a smart building, a smart city, a smart car or a connected car, a smart grid, health-care, a smart appliance industry, state-of-art medical services, and the like, through conversion or integration of existing information technology (IT) techniques and various industries.

Meanwhile, smartphones, tablet personal computers (PCs), or other terminals may connect with a cellular data network, such as a wireless fidelity (Wi-Fi) network, a long term evolution (LTE) network, or wideband-code division multiple access (W-CDMA) network to obtain data information from a server providing any data services, such as, e.g., weather information. In the process of obtaining such data information, the terminal may be subject to power consumption and billing for network connection.

FIG. 1 illustrates terminals linked to a data server providing weather information to receive weather information according to the related art.

Referring to FIG. 1, terminals 103, 105, 107, and 109 transmit weather information request messages including their location information (111, 113, 115, and 117), and a server 101 provides the weather information corresponding to the location of each terminal to each terminal (121, 123, 125, and 127).

As another example of receiving other data information, a terminal may receive its current location information through communication with a server using the global positioning system (GPS) or without the GPS.

A scheme of identifying the current location using the GPS may be operated as follows as an example. In other words, the terminal transmits longitude and latitude information obtained via the GPS to the server, and the server returns the address information corresponding to the longitude and latitude to the terminal. For reference, converting particular address information in the form of latitude and longitude information and representing the same is called geocoding, and converting latitude and longitude information in the form of a particular address is called reverse geocoding.

An example of a scheme of identifying the current location without the GPS may be operated as follows. The terminal may transmit, to the server, a message including the cell identity (cell ID) information regarding the cellular data network or information regarding one or more Wi-Fi access points (APs) currently detected, and the server may provide the terminal with location information associated with the received data. Here, the provided location information may be latitude and longitude information or geographical address information on the terminal.

FIG. 2 is a view schematically illustrating a general process for a terminal to receive information from a server in a wireless communication system according to the related art.

Referring to FIG. 2, it is assumed that there are two terminals 210 and 220. Each terminal includes an information receiver 1 211 and 221 and an information receiver 2 212 and 222, and each information receiver is directly received from an information provider 1 231 and an information provider 2 232 providing information necessary therefor. For reference, the information receiver may be a service entity providing the user with applications, widgets, or other various services contained in the terminal, and the information provider may be a server providing each information.

Meanwhile, the Bluetooth low energy (BLE) or Bluetooth smart is a low-power network technique. By the BLE, one or more peripheral devices advertise signals to indicate their presence, and the central device performs discovery to recognize the presence of the peripheral devices. Having discovered the advertisement signals from the peripheral devices through such discovery, the central device accesses the peripheral devices to utilize various functions through the peripheral devices.

As an example, in case a peripheral device is the user's smartphone, and the central device is a door lock device attached to a door, the door lock device having discovered an advertisement signal from the smartphone connects with the smartphone and determines whether the key retained in the smartphone has a valid right for entrance and exit through the connection to unlock the door. Reversely, the user's smartphone may be the central device while the door lock device is the peripheral device. In such case, the smartphone may unlock the door lock after determining whether the door lock can be unlocked.

FIG. 3 illustrates an operation by a general smart door lock device supporting BLE according to the related art.

Referring to FIG. 3, a terminal 303 supporting the BLE keeps transmitting advertisement signals (1), and when the user touches a door lock 301 (2), the door lock 301 detects the advertisement signal and authenticates the key contained in the advertisement signal to unlock the door lock (3). Then, the whole process for opening the door lock is complete (4).

The above information is presented as background information only to assist with an understanding of the present disclosure. No determination has been made, and no assertion is made, as to whether any of the above might be applicable as prior art with regard to the present disclosure.

SUMMARY

A server oftentimes provides the same data information to terminals. For example, weather information or location information (latitude/longitude information) on a particular region is a representative case. For example, when the terminals located in a particular region transmit a request for weather information or location information regarding the region to the server at similar times, the server provides the same weather information or location information to the terminals located in the region. The similar times may refer to times when the information to be provided from the server to terminals positioned under the same condition is still valid. For example, since the weather information or the current location information regarding the terminals is the same information for the terminals located in the region, and further, each terminal is basically highly likely to be equipped with the same weather-related application or widget service, there are a significant number of terminals transmitting a request for the information to the server. Further, the particular information required by multiple users, such as weather information or location information, may be updated periodically to provide up-to-date information or when such an event occurs where a service using weather information is run for use. When the terminals equipped with such weather information update service all attempt to update the information at each fixed time, the communication carrier's network and the information provider's server may temporarily experience heavy load.

Meanwhile, in the case that a door lock system uses the Bluetooth and the door lock device is the central device, the door lock device needs to consume power to discover an advertisement signal. Thus, it is common to perform advertisement detection only when a particular trigger arises. In such case, however, the particular trigger may have difficulty in occurring. As an example, under the circumstance where the door lock performs discovery only when the user touches the handle of the door lock, it may be difficult to perform triggering to unlock the door lock, e.g., when the user holds a heavy stuff with his hands. Further, when the terminal, which is the peripheral device, has to keep on transmitting advertisement signals to use the Bluetooth door lock, the terminal may face unnecessary power consumption and security issues.

Aspects of the present disclosure are to address at least the above-mentioned problems and/or disadvantages and to provide at least the advantages described below. Accordingly, an aspect of the present disclosure is to provide a method and an apparatus for communicating information by performing communication between devices in a wireless communication system.

Another aspect of the present disclosure is to provide a method and an apparatus for communicating information with minimized device power consumption upon communication between devices in a wireless communication system.

Another aspect of the present disclosure is to provide a method and an apparatus for minimizing the amount of data communicated upon communication between devices in a wireless communication system.

Another aspect of the present disclosure is to provide a method and an apparatus for performing communication between devices upon meeting a particular condition between the devices in a wireless communication system.

Another aspect of the present disclosure is to provide a method and an apparatus that may release the door lock without the user's touch in a wireless door lock system.

Another aspect of the present disclosure is to provide a method and an apparatus for sharing data files through communication between devices in a wireless communication system.

Another aspect of the present disclosure is to provide a method and an apparatus for controlling peripheral devices through communication between devices in a wireless communication system.

Another aspect of the present disclosure is to provide a method and an apparatus for communicating a high volume of information through communication between devices in a message service of a wireless communication system.

In accordance with an aspect of the present disclosure, a method for transmitting information in an inter-terminal communication system is provided. The method includes obtaining any information by a terminal, determining whether the obtained information is shared information, and transmitting, when the obtained information is the shared information, an advertisement signal including the shared information to another terminal.

In accordance with another aspect of the present disclosure, a method for communicating information in an inter-terminal communication system is provided. The method includes receiving, by a first terminal, an advertisement signal indicating presence of a second terminal from the second terminal, determining whether the first terminal and the second terminal are in proximity based on the advertisement signal received from the second terminal, and communicating necessary information with the second terminal according to a certain protocol by the first terminal.

In accordance with another aspect of the present disclosure, a method for transmitting information in an inter-terminal communication system is provided. The method includes uploading shared information to a server by a terminal, receiving information regarding an address where the shared information is stored from the server, and transmitting an advertisement signal including the information regarding the address where the shared information is stored to other terminals included in a certain sharing group.

In accordance with another aspect of the present disclosure, a method for communicating information in an inter-terminal communication system is provided. The method includes recognizing an image of a peripheral device and transmitting a message requesting a server to enable the peripheral device to transmit an advertisement signal by a terminal, receiving an advertisement signal including information on an address where control information regarding the peripheral device is stored from the peripheral device according to an instruction of the server, obtaining the address information by decoding the received advertisement signal, obtaining the control information regarding the peripheral device based on the address information, and transmitting a control message of the peripheral device to the server based on the control information regarding the peripheral device.

In accordance with another aspect of the present disclosure, a method for communicating information in an inter-terminal communication system is provided. The method includes determining the size of a message to be transmitted by a transmitting terminal, when the message is larger in size than a reference value allowed by a messaging server, transmitting information regarding a receiving terminal to the messaging server by the transmitting terminal, receiving an advertisement signal detection instruction from the messaging server by the transmitting terminal, receiving an advertisement signal of the receiving terminal and reporting reception of the advertisement signal to the messaging server by the transmitting terminal, receiving information for connection with the receiving terminal from the messaging server, and directly performing message communication with the receiving terminal.

In accordance with another aspect of the present disclosure, an apparatus for transmitting information in an inter-terminal communication system is provided. The apparatus includes a controller configured to determine, when a terminal obtains any information, whether the obtained information is shared information and a transceiver configured to transmit, when the obtained information is the shared information, an advertisement signal including the shared information to another terminal.

In accordance with another aspect of the present disclosure, an apparatus for communicating information in an inter-terminal communication system is provided. The apparatus includes a transceiver in a first terminal receiving an advertisement signal indicating presence of a second terminal from the second terminal and a controller in the first terminal determining whether the first terminal and the second terminal are in proximity based on the advertisement signal received from the second terminal, wherein the transceiver communicates necessary information with the second terminal according to a certain protocol by the first terminal.

In accordance with another aspect of the present disclosure, an apparatus for communicating information in an inter-terminal communication system is provided. The apparatus includes a transceiver in a first terminal receiving an advertisement signal indicating presence of a second terminal from the second terminal and a controller in the first terminal determining whether the first terminal and the second terminal are in proximity based on the advertisement signal received from the second terminal, wherein the transceiver communicates necessary information with the second terminal according to a certain protocol by the first terminal.

In accordance with another aspect of the present disclosure, an apparatus for transmitting information in an inter-terminal communication system is provided. The apparatus includes a controller uploading shared information to a server and a transceiver receiving information regarding an address where the shared information is stored from the server, and transmitting an advertisement signal including the information regarding the address where the shared information is stored to other terminals included in a certain sharing group.

In accordance with another aspect of the present disclosure, an apparatus for communicating information in an inter-terminal communication system is provided. The apparatus includes a camera unit recognizing an image of a peripheral device, a transceiver transmitting a message requesting a server to enable the peripheral device to transmit an advertisement signal and receiving an advertisement signal including information on an address where control information regarding the peripheral device is stored from the peripheral device according to an instruction of the server, and a controller decoding the received advertisement signal to obtain the address information and obtaining the control information regarding the peripheral device based on the address information, wherein the transceiver transmits a control message of the peripheral device to the server based on the control information regarding the peripheral device.

In accordance with another aspect of the present disclosure, an apparatus for communicating information in an inter-terminal communication system is provided. The apparatus includes a controller determining the size of a message to be transmitted by a transmitting terminal and a transceiver, when the message is larger in size than a reference value allowed by a messaging server, transmitting information regarding a receiving terminal to the messaging server by the transmitting terminal, receiving an advertisement signal detection instruction from the messaging server, receiving an advertisement signal of the receiving terminal and reporting reception of the advertisement signal to the messaging server, receiving information for connection with the receiving terminal from the messaging server, and directly performing message communication with the receiving terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
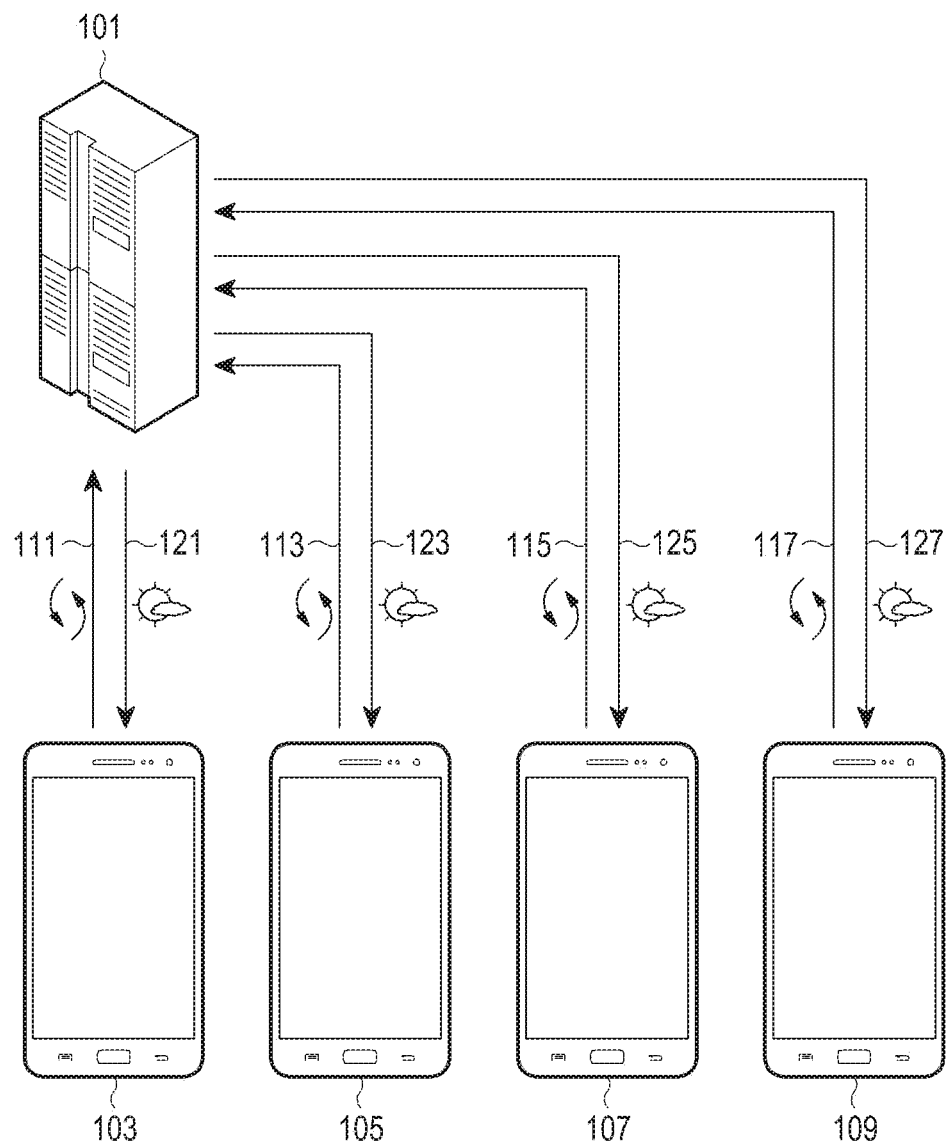
FIG. 1 illustrates terminals linked to a data server providing weather information to receive weather information according to the related art.
Figure 2:
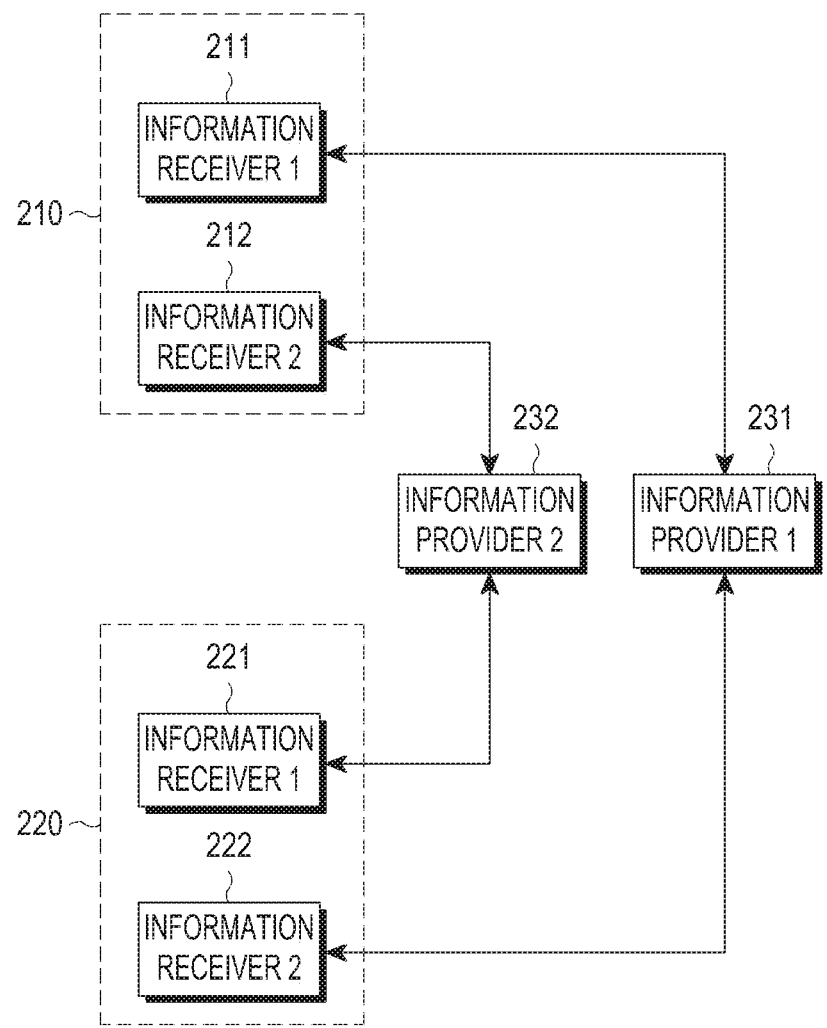
FIG. 2 is a view schematically illustrating a general process for a terminal to receive information from a server in a wireless communication system according to the related art.
Figure 3:
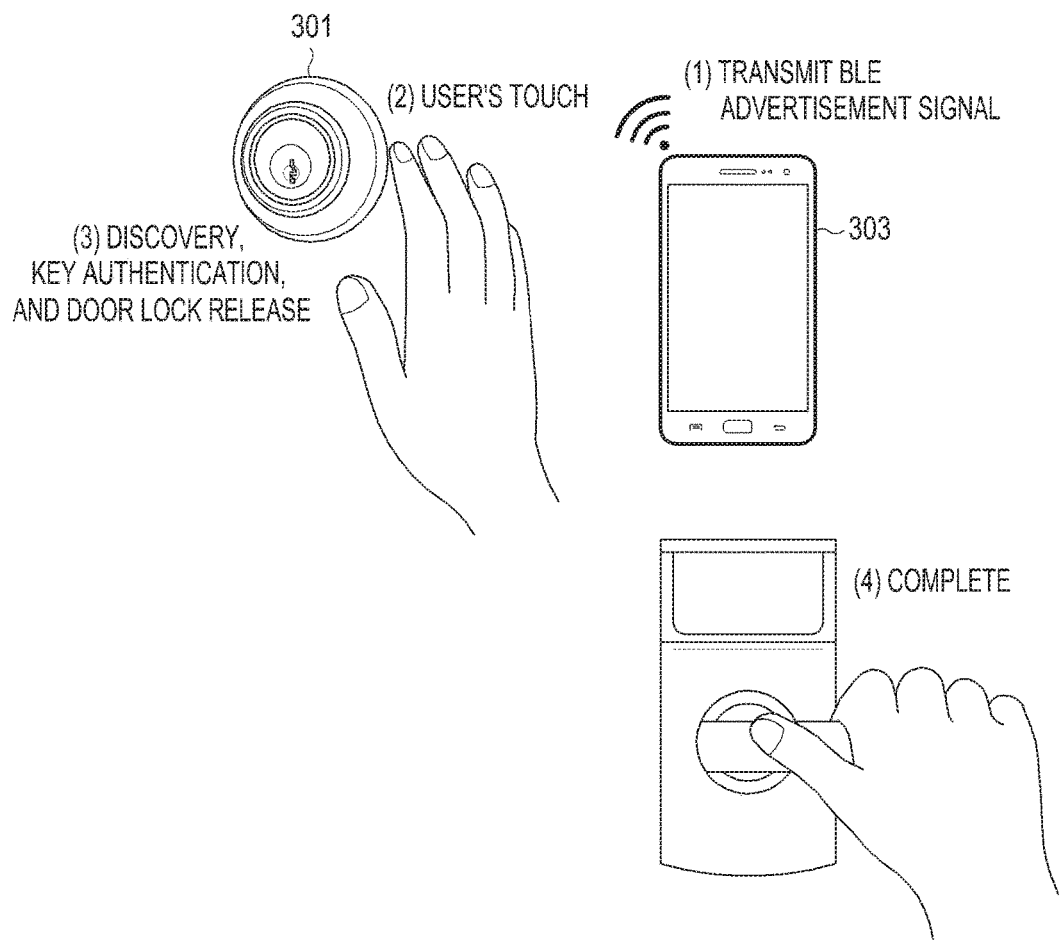
FIG. 3 illustrates an operation by a general smart door lock device supporting Bluetooth low energy (BLE) according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although the embodiments described below are separate from one another for ease of description, at least two or more of the embodiments may be combined together within such a range where they do not conflict one another.

The terms described below are defined considering the functions in embodiments of the present disclosure and may be replaced with other terms according to the intention or practice of the user or operator. Therefore, the terms should be defined based on the overall disclosure.

Various changes may be made to the present disclosure, and the present disclosure may come with a diversity of embodiments. Some embodiments of the present disclosure are shown and described in connection with the drawings. However, it should be appreciated that the present disclosure is not limited to the embodiments, and all changes and/or equivalents or replacements thereto also belong to the scope of the present disclosure.

The terms coming with ordinal numbers, such as 'first' and 'second', may be used to denote various components, but the components are not limited by the terms. The terms are used only to distinguish one component from another. For example, a first component may be denoted a second component, and vice versa without departing from the scope of the present disclosure. The term "and/or" may denote a combination(s) of a plurality of related items as listed or any of the items.

The terms as used herein are provided merely to describe some embodiments thereof, but not to limit the present disclosure. It is to be understood that the singular forms "a," "an," and "the" include plural references unless the context clearly dictates otherwise. It will be further understood that the terms "comprise" and/or "have," when used in this specification, specify the presence of stated features, integers, operations, elements, and/or components, but do not preclude the presence or addition of one or more other features, integers, operations, elements, components, and/or groups thereof.

Unless otherwise defined in connection with embodiments of the present disclosure, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, various embodiments of the present disclosure are described with reference to the accompanying drawings. The same reference denotations may be used to refer to the same or similar elements throughout the specification and the drawings. When making the gist of the present disclosure unclear, the detailed description of known functions or configurations is skipped. It should be noted that the following description primarily focuses on what is necessary for understanding the operations of the embodiments of the present disclosure, omitting descriptions unnecessary for clarifying the subject matter of the present disclosure.

Apparatuses and methods as proposed herein may be applicable to various communication systems including, but not limited to, long-term evolution (LTE) wireless communication systems, long-term evolution-advanced (LTE-A) wireless communication systems, high speed downlink packet access (HSDPA) wireless communication systems, high speed uplink packet access (HSUPA) wireless communication systems, 3rd generation project partnership 2 (3GPP2) high rate packet data (HRPD) wireless communication systems, wideband code division multiple access (WCDMA) wireless communication systems, code division multiple access (CDMA) wireless communication systems, Institute of electrical and electronics engineers (IEEE)

802.16m communication systems, evolved packet systems (EPSs), and mobile Internet protocol (Mobile IP) systems.

Prior to the description of embodiments according to an aspect of the present disclosure, the basic concept of the aspect of the present disclosure was described above.

According to the present disclosure, when a device meets a particular condition in inter-device communication, the device advertises signals including certain information to adjacent devices, and the adjacent devices receive the advertised signals to use the certain information included in the advertised signals.

According to a first aspect of the present disclosure, the particular condition may refer to a case where, when the certain information is preset particular information, such as weather information or location information, and the device obtains the certain information, the certain information is valid. As an example, when the terminal obtains weather information from the server and determines that the weather information is valid for a certain period, the terminal transmits the weather information to an adjacent area in the form of an advertisement signal. Accordingly, an adjacent terminal receiving the advertisement signal may use the weather information contained in the advertisement signal. Further, the adjacent terminal may re-advertise the weather information to an adjacent area for a certain valid period. By doing so, the same information for the terminals located in a particular area, such as weather information, may be communicated with a neighbor terminal, but not with the server. Detailed embodiments of the first aspect of the present disclosure are given below.

Meanwhile, in connection with an embodiment of a second aspect of the present disclosure, the particular condition may refer to two devices being positioned adjacent to each other within a certain distance. For example, upon determining that terminal B approaches terminal A, terminal A transmits a Bluetooth low energy (BLE) advertisement signal to terminal B, and terminal B may perform discovery on the advertisement signal. Detailed embodiments of the second aspect of the present disclosure are given below.

Hereinafter, the embodiments are described focusing on the use of advertisement signals according to the BLE technique. However, the present disclosure is not limited to the BLE, and the inter-terminal communication may be conducted through low-power short-range communication, such as ultrasound.

Figure 4:
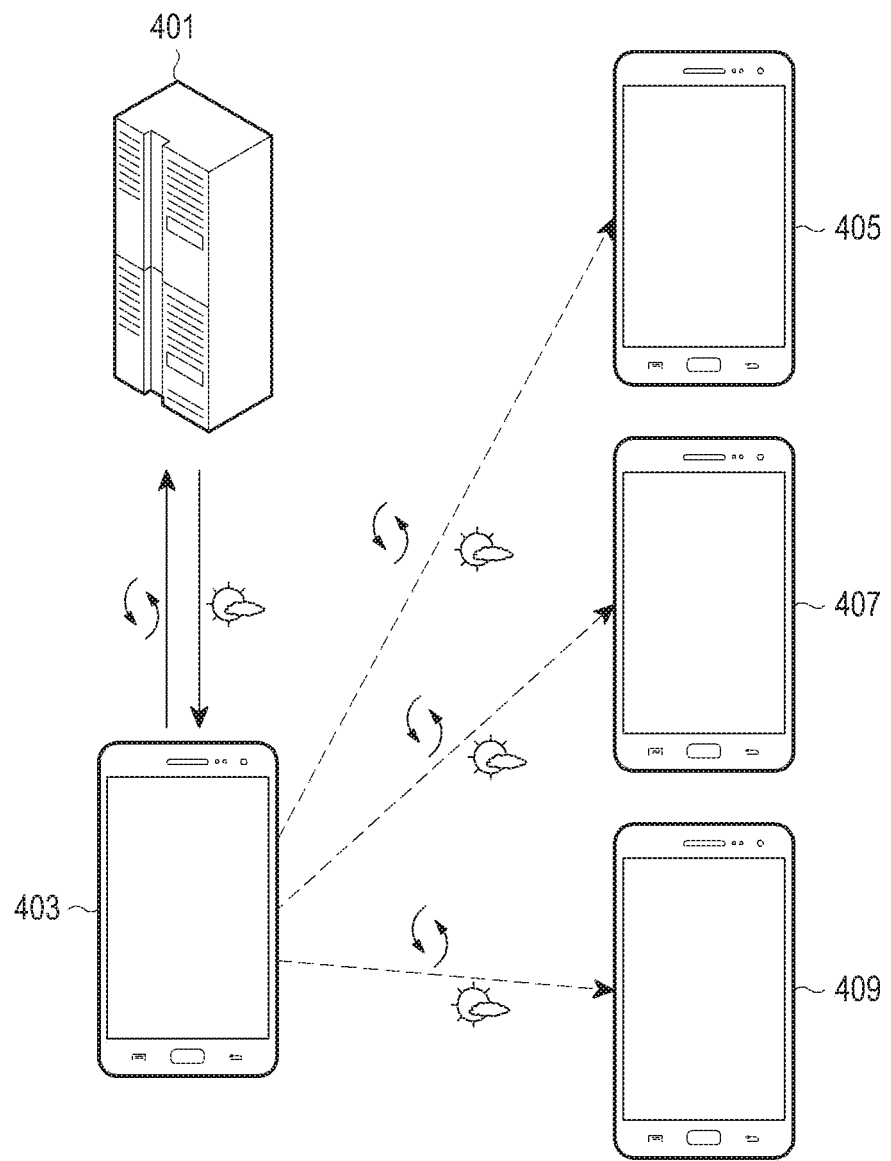
FIG. 4 illustrates a concept of an embodiment according to an embodiment of the present disclosure.

FIG. 4 illustrates a concept of an embodiment according to an embodiment of the present disclosure.

Referring to FIG. 4, a terminal 1 403 directly receives weather information from a server 401 providing the weather information. Meanwhile, since terminals 2 405, 3 407, and 4 409 are located in the same region as terminal 1 403, they receive the weather information from terminal 1 403 having the weather information on the region rather than directly receiving the weather information from the server 401. To that end, terminal 1 403 directly receiving the weather information from the server 401, since the weather information corresponds to preset "particular information" to be shared with other terminals, transmits the weather information to adjacent terminals as BLE advertisement signals. Meanwhile, the other terminals 405, 407, and 409, since the weather information corresponds to the "particular information" to be previously set to be received from other terminals, perform discovery for detecting the BLE advertisement signals in order to receive the weather information from terminal 1 403. The other terminals 405, 407, and 409 may receive the weather information through the discovery. Meanwhile, the other terminals 405, 407, and 409 may retransmit the weather information as advertisement signals during the valid period of the weather information or within the number of valid hops of the weather information so that the weather information may be shared with other adjacent terminals For reference, the valid period of the weather information refers to a period during which the weather information is valid in the region. Further, the number of valid hops refers to the number of times in which the weather information may be delivered through terminals since the weather information is meaningful only in a certain region. The server 401 may also advertise the information regarding the valid period or the number of valid hops when advertising the weather information in order to display temporal/spatial restrictions on the sharing of the weather information. However, unless the valid period information or the number of valid hops is displayed in the advertisement including the weather information, the valid period or the number of valid hops regarding the weather information may be set by the own determination of the terminals 402, 405, 407, and 409 having received the weather information.

Hereinafter, the valid period and/or the number of valid hops may be referred to as a "sharing condition" regarding the particular information.

Hereinafter, specific operations of entities for signal communication and the configuration of terminals according to embodiments of the first aspect of the present disclosure are described with reference to FIG. 5. Meanwhile, although not shown in FIG. 5 and not included in the configuration of the terminals, the terminals each may include a controller to control the overall operation of the terminal according to the present disclosure. Further, each terminal may include a transceiver to communicate information, signals, or messages with other entities.

Figure 5:
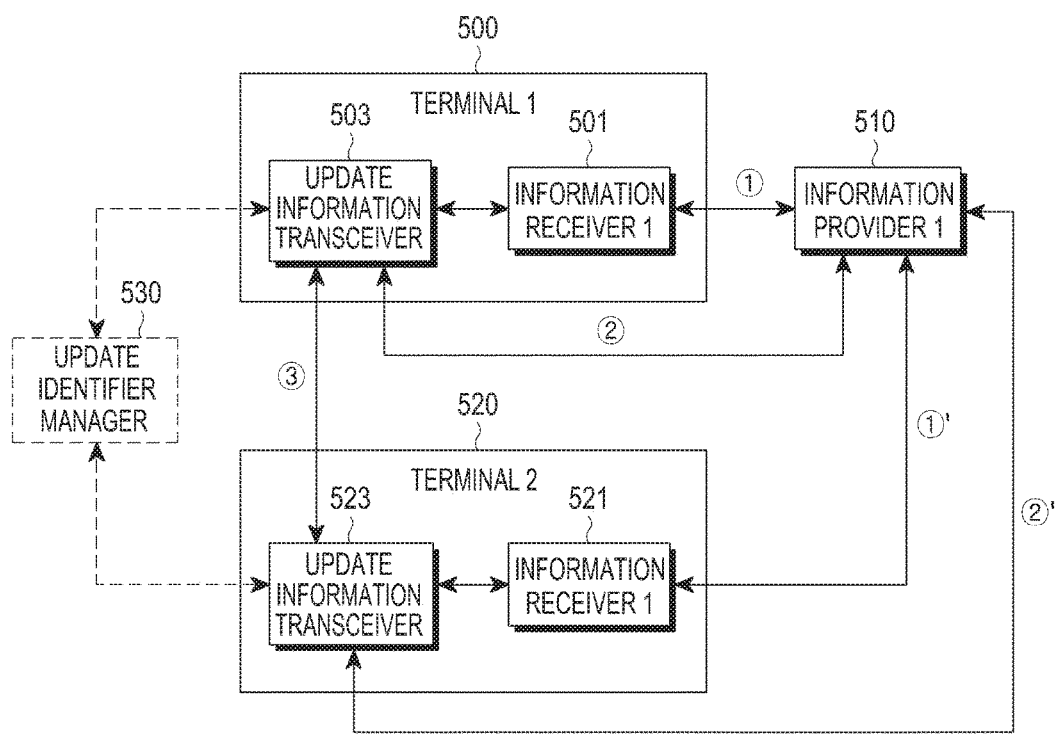
FIG. 5 illustrates an information receiver of a terminal receiving particular information according to an embodiment of the present disclosure.

FIG. 5 illustrates an information receiver of a terminal receiving particular information according to an embodiment of the present disclosure.

Referring to FIG. 5, the entity providing preset particular information, such as weather information or location information, is called an information provider 510. The information provider 510 may be a server providing the particular information. Meanwhile, the entity receiving and consuming the particular information in each of terminal 1 500 and terminal 2 520 is called an information receiver 501 and 521. Typically, the information receiver may be a service entity, such as an application or widget, providing a service to the user using particular information. There may be a plurality of information providers 510, and a plurality of information receivers 501 and 521 may be included in terminal 1 500 and terminal 2 520. For example, it is the case that there are an information provider and an information receiver for weather information and an information provider and an information receiver for location information. FIG. 5 illustrates an example in which each terminal includes one information receiver, for the purpose of description.

According to an embodiment of the first aspect of the present disclosure, the information receiver 501 of terminal 1 500 may receive the particular information, generally through three paths. First, the information receiver 501 of terminal 1 500 may directly receive the particular information from information provider 1 510. Second, the information receiver 501 of terminal 1 500 may receive the particular information through an update information transceiver 503 having received the particular information from information provider 1 510. Finally, when terminal 2 520 has the particular information, the information receiver 501 may receive the particular information through the update information transceiver 503 from the terminal 520.

Each component shown in FIG. 5 is briefly described. Terminal 1 500 and terminal 2 520 each include one information receiver 1 501 and 521 and update information transceiver 503 and 523.

The information receiver 501 and 521 is typically an application or service entity driven on the terminal and may receive weather information directly from the information provider 510 or through the update information transceiver 503 and 523.

The update information transceiver 503 and 523 may perform a function as local proxy in the terminal 500 and 520 upon communication between the terminal 500 and 520 and the information provider 510 to receive the particular information from information provider 1 510 and transfer the same to information receiver 1 501 and 521. Further, the update information transceiver 503 and 523 may communicate with other terminals 520 and 500 to provide the particular information contained in the terminals 500 and 520 or receive the particular information contained in the other terminals 520 and 500.

Meanwhile, FIG. 5 shows an update identifier manager 530 in dotted lines. The update identifier manager 530 may update a mapping relation between the update identifier and the original information available to reduce the size of the information communicated between the update information transceivers 503 and 523 in terminal 1 500 and terminal 2 520 and may sync the updated mapping relation with the update information transceiver 503 and 523.

As an example, as per the BLE communication standards, when the size of the particular information is a certain value (31 bytes) or more, the particular information cannot be communicated between the terminals. Considering this, the update identifier manager 530 may convert the particular information (A) with a larger volume of data into other data (B) with a smaller volume of data, maps the original data A with the converted data B and manages them, and provide the same to the update information transceiver 503 and 523. Thereafter, data B mapped to data A may be converted into data C by any entity for data security purposes. When the data mapping relation is changed so, the update identifier manager 530 syncs the changed mapping relation with the update information transceiver 503 and 523 in each terminal.

Hereinafter, embodiments of the present disclosure are described based on the components of the present disclosure described above in connection with FIG. 5.

The first aspect of the present disclosure generally comes with four embodiments.

A first embodiment of the present disclosure is a scheme in which an information receiver receives particular information using an update information transceiver but not the update identifier manager.

A second embodiment of the present disclosure is a scheme in which an information receiver receives particular information using an update information transceiver while using together the update identifier manager.

A third embodiment of the present disclosure is a scheme in which an information receiver receives particular information through an update information transceiver or information provider but does not use the update identifier manager.

A fourth embodiment of the present disclosure is a scheme in which an information receiver receives particular information through an update information transceiver or information provider while not using together the update identifier manager.

Since the third embodiment of the present disclosure and the fourth embodiment of the present disclosure are schemes in which the information receiver directly receives the particular information or the update information transceiver receives the particular information, the information receiver and the update information transceiver may be included in one application or service entity.

Based on the above details, embodiments of the present disclosure are described below.

Figure 6:
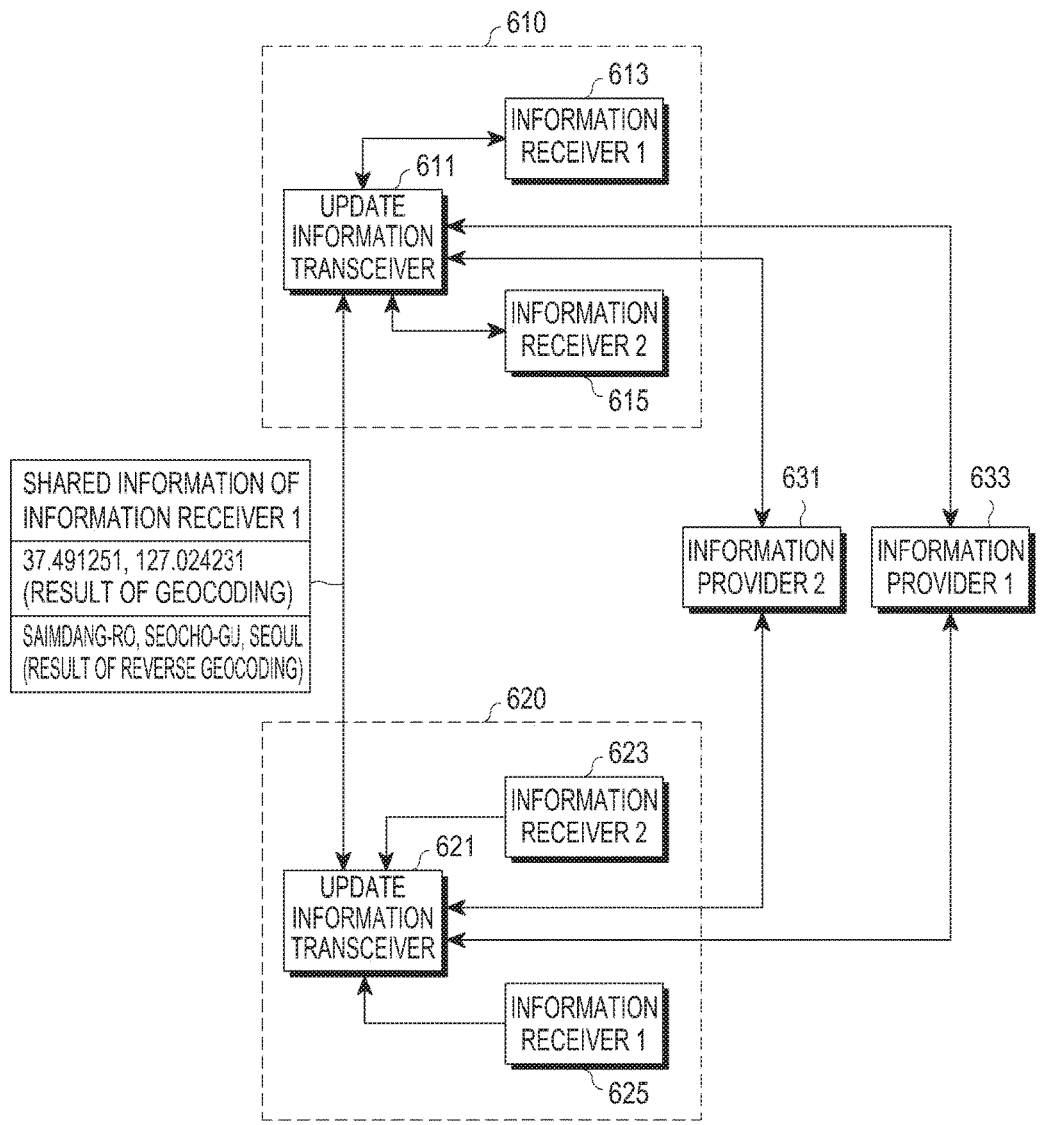
FIG. 6 illustrates an operation according to a first embodiment of the present disclosure.

FIG. 6 illustrates an operation according to a first embodiment of the present disclosure.

In connection with FIG. 6, it is assumed that a terminal 1 610 and a terminal 2 620 each includes two information receivers 613 and 615 or 623 and 625 and information provider 1 631 and information provider 2 633 are present. It is assumed that information provider 1 631 provides location information, and information provider 2 635 provides weather information. However, although a scheme of obtaining location information by information receiver 1 613 is described below for ease of description, the scheme may apply likewise when information receiver 2 615 obtains weather information.

As described above, the first embodiment of the present disclosure is a scheme in which an information receiver receives particular information using an update information transceiver but not the update identifier manager.

For example, under the circumstance where the information receiver 613 of terminal 1 610 should receive the location information, the update information transceiver 611 may operate as if the update information transceiver 611 is information provider 1 631 providing the location information. To that end, the update information transceiver 611 may bind the destination domain of the message transmitted by the information receiver 1 613 of terminal 1 610 to the internet protocol (IP) address of the update information transceiver 611.

For example, when the destination domain of the message transmitted from information receiver 1 613 is "weather.co.kr," and the IP address corresponding to the domain is "123.456.789.123," the update information transceiver 611 binds the destination domain not to the IP address of the destination domain but to the IP address of the update information transceiver 611, i.e., "127.0.0.1." This originates from the idea that in the typical domain name system (DNS) procedure, the host, which is the DNS bind list in the DNS inquiry, is first searched, and is of the scheme of binding the IP address of the update information transceiver 611, not the original IP address, to the host. Another available scheme is a scheme in which the update information transceiver 611 operates as proxy.

Meanwhile, when the update information transceiver 611 receives a request for information on information provider 1 631 from information receiver 1 613, the update information transceiver 611 attempts to obtain the location information from other terminal by performing BLE discovery rather than directly obtaining the location information from information provider 1 631. In other words, since the information requested by information receiver 1 613 is the location information, which is the particular information set to perform discovery, the update information transceiver 611 performs BLE discovery, detects the location information included in the other terminal through the discovery, receives the weather information from the other terminal, and provides the same to information receiver 1 613.

For example, referring to FIG. 6, the update information transceiver 611 of terminal 1 610 performs BLE discovery, detects the weather information advertised by an update information transceiver 621 of terminal 2 620, and transfers the same to information receiver 1 613. Meanwhile, since the update identifier manager 530 is not used in the first embodiment of FIG. 6, the location information shared by information receiver 1 is latitude/longitude information or actual address information directly indicating the location of the region.

For reference, the location information contained in the update information transceiver 621 of terminal 2 620 may be information having been directly received from information provider 1 631 or having been received from other terminal.

Figure 7:
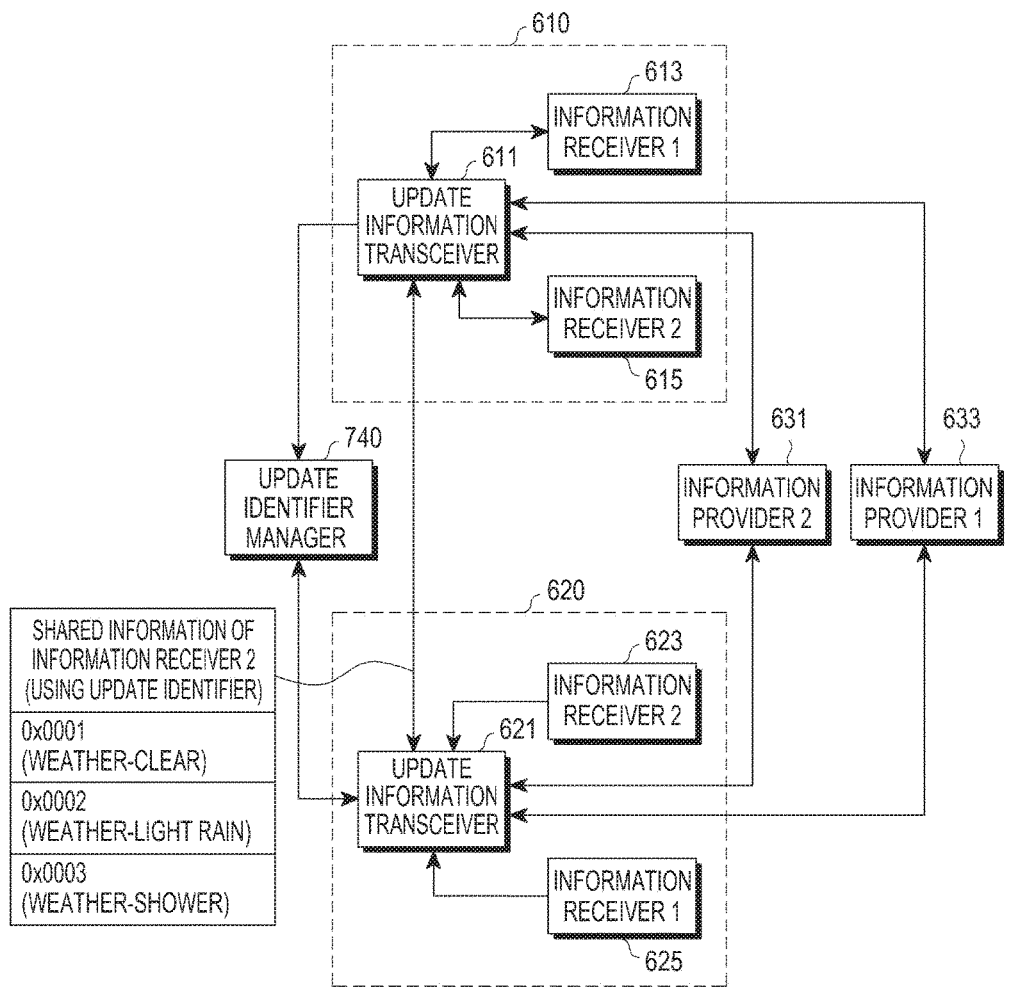
FIG. 7 illustrates an operation according to a second embodiment of the present disclosure.

FIG. 7 illustrates an operation according to the second embodiment of the present disclosure.

In connection with FIG. 6, like FIG. 6, it is assumed that terminal 1 610 and terminal 2 620 each includes two information receivers 613 and 615 or 623 and 625 and information provider 1 631 and information provider 2 633 are present. It is assumed that information provider 1 631 provides location information, and information provider 2 635 provides weather information. However, although a scheme of obtaining weather information by information receiver 2 615 is described below for ease of description, the scheme may apply likewise when information receiver 1 613 obtains location information.

As described above, the second embodiment of the present disclosure is a scheme in which an information receiver receives particular information using an update information transceiver while using together the update identifier manager.

Referring to FIG. 7, an update identifier manager is denoted with reference numeral 740. The second embodiment of the present disclosure is described below.

Upon communicating particular information to share the particular information between terminals, when the volume of data of the particular information becomes a certain value or more, the communication of the particular information between the terminal may be limited. As an example, in the BLE, an advertisement signal is limited to a data size of 31 bytes. Accordingly, an advertisement signal whose size exceeds 31 bytes cannot be communicated. Thus, the particular information with a size exceeding the certain volume of data may be converted or replaced (hereinafter, collectively referred to as converted) into other information with a smaller volume of data, and the converted information may be used to perform communication between terminals. For example, when the update information transceiver 621 of terminal 2 620 includes weather information, and the size of the weather information exceeds a certain value, the information mapped to the weather information is transmitted as an advertisement signal. According to a predefined mapping relation, a larger volume of data is converted into a smaller volume of data that is then transmitted as an advertisement signal, instead of the larger volume of data. Then, the update information transceiver 611 of terminal 1 610 detects the advertisement signal containing the converted information and restores the converted information to the original weather information. As an example, when the original information regarding the weather information is "light rain," and the data volume of the "light rain" exceeds a certain value, assuming that "0x0002" with a data volume smaller than the certain value has been agreed on as information indicating the "light rain," the information, "0x0002," rather than the "light rain," is communicated between the terminals.

The mapping relation between the original information and the converted information is managed by the update identifier manager 740. For example, the update information transceiver 611 and 621 obtains the information on the mapping relation between the original information and the converted information through message exchange with the update identifier manager 740.

However, the mapping relation between the original information and the converted information sometimes needs to be changed, e.g., for security purposes. Although the conversion information corresponding to the "light rain" was initially "0x0002," the update information transceiver 621 of terminal 1 620 may change the same into "0x0018," e.g., for the purpose of security and management, and when the mapping relation is changed so, the changed mapping relation should be delivered to the update identifier manager 740. The update identifier manager 740 receiving the changed mapping relation should provide the changed content to all of the terminals. However, according to the present disclosure, the entity changing the mapping relation is not limited to a particular terminal or server, and such assumption may be made that whatever entity may attempt to change the mapping relation for whatever reasons.

In order to provide the mapping relation, the update identifier manager 740 may use a scheme for maintaining the application including the update identifier or the operating system (e.g., Android or Tizen) including the application up-to-date or maintaining only the application or corresponding information of the terminal up-to-date.

As described above, the third embodiment of the present disclosure is a scheme in which an information receiver receives particular information through an update information transceiver or information provider but does not use the update identifier manager.

Specifically, in the third embodiment of the present disclosure, the terminal may first attempt to obtain the particular information from other terminal but not from the server. As an example, under the assumption that a weather widget is the information receiver, when the weather widget desires to obtain the current location information on the terminal, the information receiver in the terminal may attempt to receive the location information already obtained and shared by other terminal using the update information transceiver.

On the contrary, the terminal attempts to directly obtain the particular information from the server, and when the attempt fails, may try to obtain the particular information from the other terminal. For example, when the information receiver in the terminal transmits requests for the particular information to the information provider a certain number of times, but fails to receive a reply from the information provider, the terminal may attempt to obtain the particular information from other terminal using the update information transceiver. For reference, as an example of transmitting the requests for the information to the information provider a certain number of times, the request for an HTTP GET message for the same URL may be made a certain number of times.

In other words, the third embodiment of the present disclosure is an embodiment in which the information receiver in the terminal first obtains the particular information from other terminal through the update information transceiver, or when the information receiver first transmits a request for the particular information to the information provider but fails, the information receiver re-attempts to obtain the particular information through the update information transceiver.

Meanwhile, the fourth embodiment of the present disclosure is a scheme in which an information receiver receives particular information through an update information transceiver or information provider while not using the update identifier manager. This embodiment of the present disclosure is a combination of the operations described above in connection with the third embodiment of the present disclosure and the description of the update identifier manager described above in connection with the second embodiment of the present disclosure, and thus, no further detailed description thereof is given.

Meanwhile, as in the above-described embodiments of the present disclosure, the scheme of communicating particular information using BLE advertisement signals between terminals enables information desired by a terminal to be communicated at lower power. Accordingly, it may be operated at a shorter period than the period of reception of information in the scheme in which the terminal directly obtains the particular information from the information provider. As an example, when the information receiver of the terminal directly receives weather information from the information provider every hour, the update information transceiver in the terminal may attempt to receive the weather information at a shorter period, e.g., every 30 minutes.

Now described is the "sharing condition" that may indicate the temporal or geographical range within which the particular information is valid when the particular information, such as weather information or location information, is shared.

As set forth above, the temporal range and geographical range where the particular information is shared according to sharing condition information may be set to the particular information corresponding to a preset condition, such as weather information or location information. The sharing condition information may be known by being included in a BLE advertisement signal together with the particular information or through separate information communication.

First, as the sharing condition information, valid period information is described.

The terminal having obtained the particular information may transmit an advertisement signal including the particular information during a valid period for the particular information. However, upon failing to obtain the valid period information regarding the obtained particular information, the particular information may be shared with adjacent terminals within a time period during the particular information is determined to be valid from the time when the particular information has been obtained. For example, when the information receiver directly obtains weather information from the information provider and there is no valid period information on the weather information, a default value (e.g., two hours) may be set as the valid period for the weather information, and the weather information may be shared with other terminals for the two hours. As another example, when the update information transceiver obtains the weather information from the update information transceiver of other terminal, and there is no valid period information, a shorter time period (e.g., one hour) may be set as the valid period, and the weather information may be shared with other terminals for the one-hour period. Accordingly, the sharing condition information may contain the date and time that the information has been generated. For example, although there is no valid period directly set, when information on the time of generation of the weather information is included, a restriction may be implicitly posed as to how long the weather information remains valid information. However, the information on the time of generation may typically be transmitted as an advertisement signal, together with the weather information.

Information on the number of hops (simply, hop count information) is described below, as an aspect of the sharing condition information.

Since the particular information, such as weather information or location information, is valid for any region alone, the number of hops for transferring the information from one terminal to another may be set to restrict the geographical sharing range of the particular information. However, the means to represent the geographical range is not limited to the form of hope count information, and the geographical range for the particular information may be restricted in whatever ways. An available scheme other than setting the hop count regarding the particular information is to set an application or terminal receiving the particular information. To that end, a terminal or application failing to receive the particular information or a terminal or application capable of receiving the particular information may be designated. For such purpose, reception identifier information to designate or exclude a terminal or application may be set as the sharing condition information.

The sharing condition information for the particular information described above may be set by the information provider first transmitting the particular information or the terminal receiving and sharing the particular information with other terminals.

As an example, the information provider may include the sharing condition information, such as time of generation, valid period, and hop count limitation information in the weather information when transmitting the weather information on a particular region, and the update information transceiver of the terminal receiving the channel detection interval-containing weather information may add the current hop count to the sharing condition information while advertising the weather information.

However, only time of first advertisement or current hop count information, but not the valid period information or hop count limitation, may be included in the sharing condition information. The update information transceiver receiving the particular information may determine whether to re-share the particular information on its own considering the time of first advertisement or current hop count information.

Figure 8:
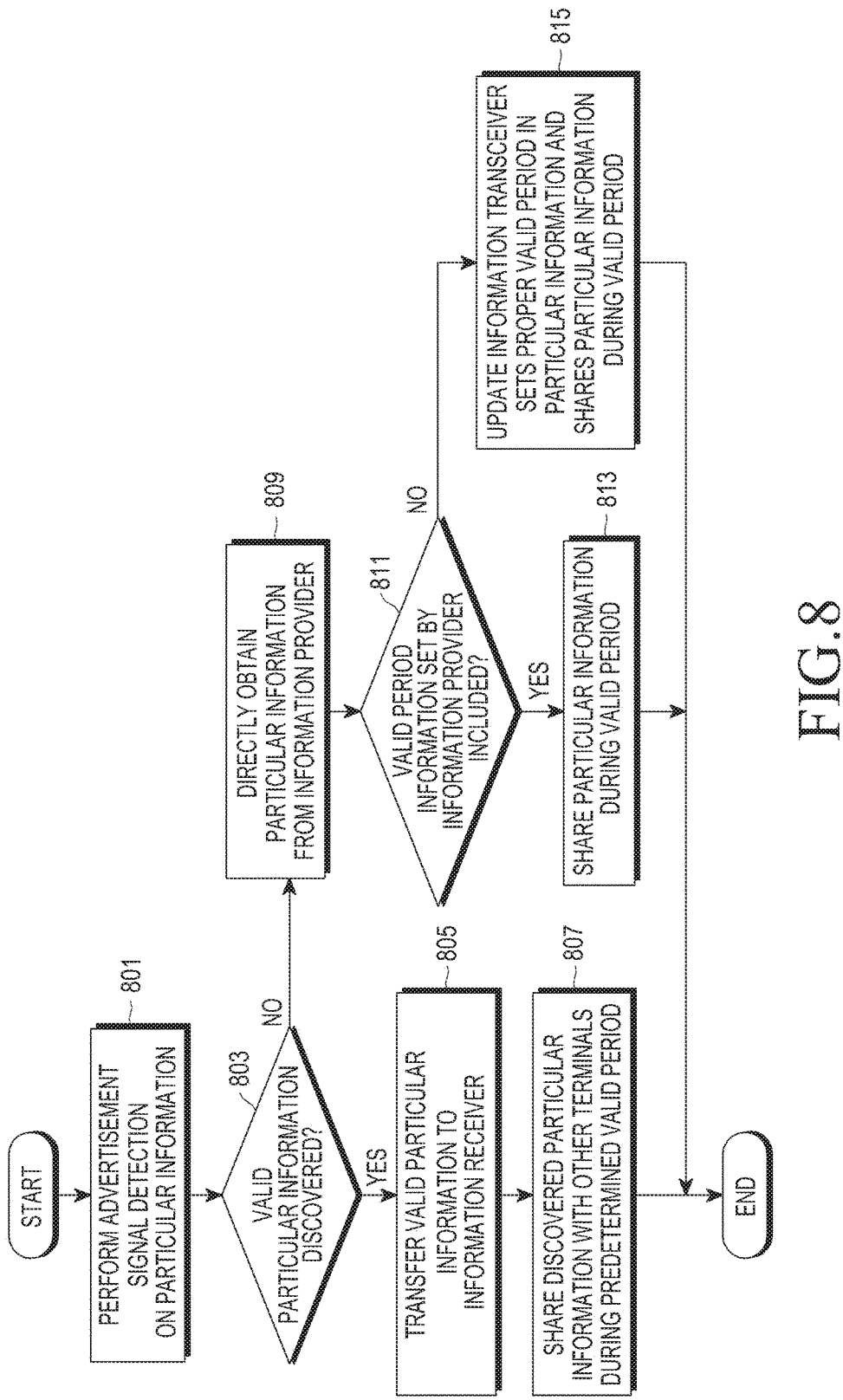
FIG. 8 illustrates an operation by a terminal according to an embodiment of the present disclosure.

FIG. 8 illustrates an operation by a terminal according to an embodiment of the present disclosure.

The description of FIG. 8 is, among the operations of the terminal according to the above-described third embodiment of the present disclosure, the embodiment of the present disclosure in which the terminal first attempts to receive the particular information from other terminal, and upon failure to receive the particular information, the information receiver directly receives the particular information from the information provider.

Referring to FIG. 8, in operation 801, the update information transceiver of the terminal first performs an operation of detecting an advertisement signal for preset particular information, such as weather information. This is for obtaining the particular information advertised by other terminal.

In operation 803, it is determined whether valid particular information is discovered through the advertisement signal detection operation.

When the valid particular information is discovered, the valid particular information is transferred to the information receiver in operation 805. Here, the valid particular information refers to particular information permitted to be shared by a sharing condition, such as a valid period and/or a limited hop condition when the sharing condition is set to the particular information, and information that may be currently taken as valid considering the first advertisement time or current hop count for the particular information unless the sharing condition of the valid period and/or limited hop condition is set. However, it is assumed that a valid period is set to the particular information for the purpose of description.

In operation 807, the discovered particular information is transmitted through an advertisement signal for the set valid period so that the particular information is shared with other terminals during the valid period.

Unless the valid particular information is discovered in operation 803, the process goes to operation 809 in which the information receiver directly receives the particular information from the information provider.

In operation 811, it is determined whether the obtained particular information contains valid period information. When the valid period information is included, the process goes to operation 813 to share the particular information during the valid period. Unless the valid period information is included, the process may go to operation 815 in which the update information transceiver may set a proper valid period to the particular information obtained from the information provider and share the particular information during the valid period.

Another embodiment of the first aspect of the present disclosure is now described.

The above-described embodiments of the present disclosure are embodiments in which the terminal obtains weather information or location information from the server, transmits the obtained information to adjacent terminals through advertisement signals, and share the weather information or location information with the other terminals.

In the following embodiments of the present disclosure, the terminal includes information necessary to control a particular function of other terminal in an advertisement signal and transmits the same, and the other terminal uses the information contained in the received advertisement signal to control the particular function included in the terminal.

Examples of the particular function include a Wi-Fi function or positioning function equipped in the terminal. For reference, the Wi-Fi function or positioning function may be performed by a Wi-Fi module or positioning module included in the terminal.

First, the following is an example in which the terminal uses the information contained in the received advertisement signal to control the Wi-Fi function.

Terminals whose Wi-Fi function is off may attempt to receive advertisement signals continuously or at certain periods, and a terminal linked to a Wi-Fi access point (AP) may include the identifier information on the Wi-Fi AP to which the terminal is linked in an advertisement signal and transmit the AP identifier information-containing advertisement signal so that the terminals whose Wi-Fi function is off may turn on the Wi-Fi function. For reference, the AP identifier information may be a service set identifier (SSID) or basic service set identifier (BSSID). Meanwhile, the terminals with Wi-Fi function off may receive the advertisement signal and access the Wi-Fi AP corresponding to the AP identifier information included in the advertisement signal.

As a specific example, when the terminal is linked to the Wi-Fi AP accessible by all terminals not requiring a Wi-Fi protected access (WPA) password or passphrase or when the strength of a Wi-Fi signal making a connection to the Wi-Fi AP is a certain value or more, and the connection to the Wi-Fi AP lasts a certain reference time or longer, the terminal linked to the Wi-Fi AP transmits advertisement signals including the identifier information on the Wi-Fi AP. When the terminals with Wi-Fi function off receives the advertisement signals including the identifier information on the Wi-Fi AP or receive the advertisement signals for a certain time and/or a certain number of times or more, the terminals receiving the advertisement signals may turn on the Wi-Fi function and use the Wi-Fi identifier information included in the advertisement signals to access the Wi-Fi AP.

However, the terminal may access the Wi-Fi AP even without receiving the advertisement signals containing the AP identifier information. As an example, when there is an Wi-Fi AP to which the terminal has accessed before or there is a Wi-Fi AP provided by the provider or operator of the communication service the terminal is subscribing to, the terminal may access the Wi-Fi AP using a previous access history or stored Wi-Fi AP identifier information even without receiving the advertisement signal including the AP identifier information.

Next, an example of controlling a positioning function using information contained in an advertisement signal received by the terminal is described as follows.

Generally, the terminal has a positioning function for estimating its location based on information from a Wi-Fi and/or cellular network or using the global positioning system (GPS). In many cases, however, the GPS is unavailable to position the terminal when the terminal is positioned indoors. Accordingly, an attempt to use the GPS to position the terminal located indoors may be unnecessary.

From this perspective, the terminal using location information indoors may transmit advertisement signals to prevent other terminals from positioning the terminal using the GPS. For example, the terminal using the location information indoors may include previously agreed-on information instructing not to use the GPS in an advertisement signal and transmit the same. Other terminal may receive the previously agreed-on information included in the advertisement signal, and the terminal may attempt to position itself directly using the information from the Wi-Fi and/or cellular network without using the GPS. Accordingly, such waste of resources may be prevented where the terminal positioned indoors attempts to position using the GPS.

The embodiments of the first aspect of the present disclosure have been described thus far. Hereinafter, embodiments of the second aspect of the present disclosure are described.

The basic idea of the embodiments of the second aspect of the present disclosure is that it is determined whether a first entity and a second entity are positioned adjacent to each other, and if so, the first entity transmits a BLE advertisement signal including a certain signal, and the second entity uses the information included in the advertisement signal.

First described is a scheme in which when two entities are in proximity, one of the entities may be aware that the other entity is in proximity. Here, it is assumed that the two entities are a first terminal and a second terminal, respectively.

In a first scheme, it may be determined whether the two terminals are positioned adjacent to each other by identifying the position of the terminals using network information, such as a legacy GPS and a cell identifier (Cell ID) or Wi-Fi. However, such scheme of determining whether they are positioned adjacent to each other using the network information cannot present exact information as to the situation where the terminals are mutually within a 1 m or less distance due to errors in the location information.

As a second scheme, the first terminal may temporarily transmit a BLE advertisement signal at such a signal strength that the opposite party, i.e., the second terminal, may receive the advertisement signal, and the second terminal receiving the advertisement signal may identify that the first terminal is positioned adjacent to the second terminal. For example, the terminals may determine whether other terminal is positioned adjacent to them by scanning the advertisement signal transmitted from adjacent terminals.

Figure 9:
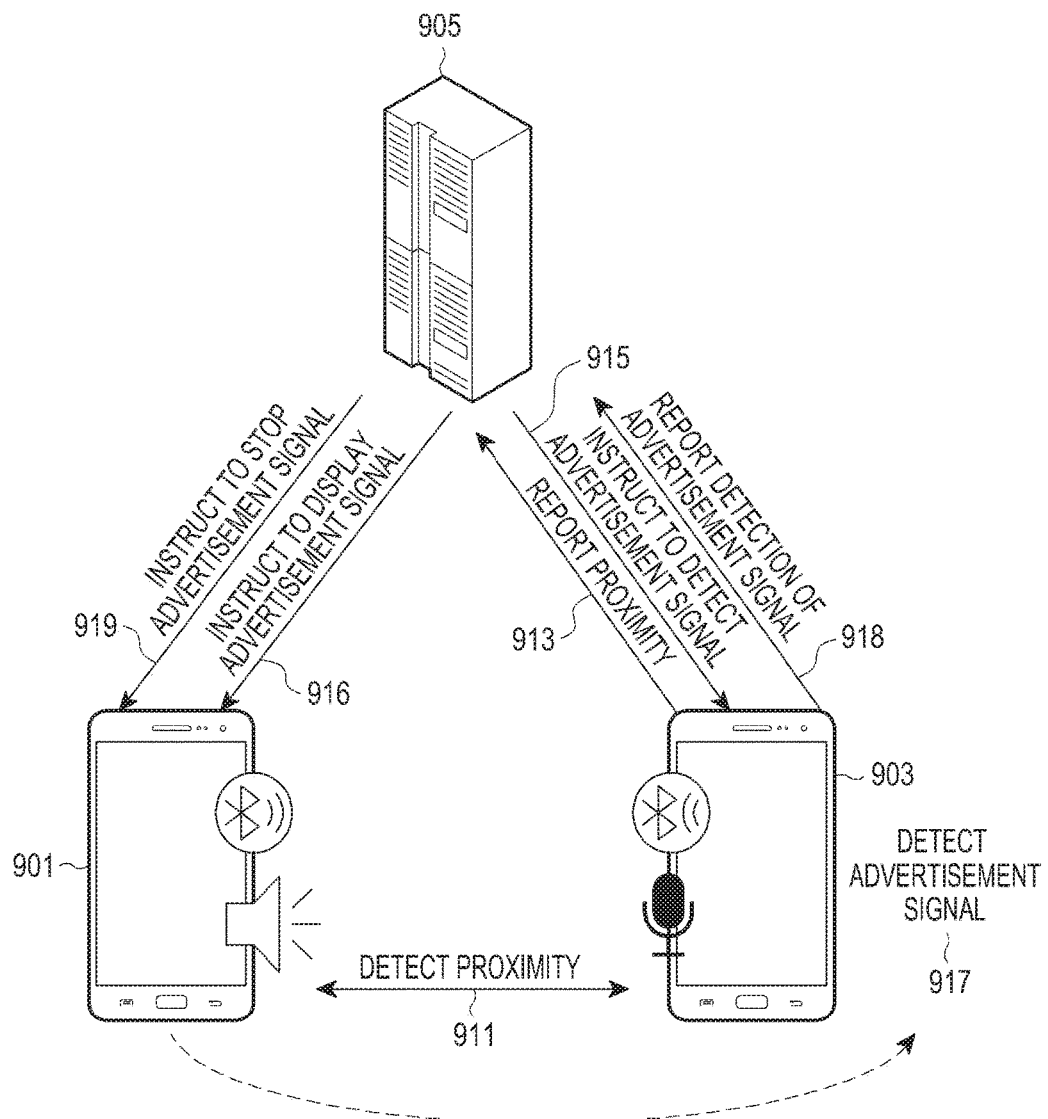
FIG. 9 illustrates a process of determining whether terminals are positioned adjacent to each other using a BLE advertisement signal according to an embodiment of a second aspect of the present disclosure.

FIG. 9 illustrates a process of determining whether terminals are positioned adjacent to each other using a BLE advertisement signal according to an embodiment of a second aspect of the present disclosure.

Referring to FIG. 9, in operation 911, a second terminal 903 grasps the location information regarding a first terminal 901 and the second terminal 903, e.g., using the above-described network information and roughly grasps the two terminals being positioned adjacent to each other based on the grasped location information. However, since the network information has been used in operation 901, errors as to whether they are positioned adjacent to each other may occur. Accordingly, the proximity or not is determined once more using the BLE advertisement signal in order to more accurately determine whether the two terminals are in proximity.

Specifically, in operation 913, the second terminal 903 informs a server 905 that the first terminal 901 and the second terminal 903 are estimated to be in proximity, and in operation 915, the server 905 instructs the second terminal 903 to detect the BLE advertisement signal, and in operation 916, simultaneously or sequentially instructs the first terminal 901 to transmit the BLE advertisement signal.

Accordingly, the first terminal 901 transmits the BLE advertisement signal, and in operation 917, the second terminal 905 detects the BLE advertisement signal. The second terminal 905 detecting the BLE advertisement signal may clearly determine that the first terminal 901 is in proximity to the second terminal 905.

In operation 918, the second terminal 905 informs the server 905 that the advertisement signal has been detected. Since the two terminals being in proximity has been apparent through communication of the advertisement signal, the first terminal 901 need not transmit advertisement signals any longer. Accordingly, in operation 919, the server 905 instructs the first terminal 901 to stop transmission of advertisement signals. Thereafter, since the two terminals being in proximity has become clear, the two terminals may perform subsequent necessary operations. As an example, the two terminals may communicate necessary information using the technique, e.g., Wi-Fi direct, which may present good performance only when the two terminals are in close proximity.

As a variation to the embodiment of the present disclosure described in connection with FIG. 9, operations 911 and 913 may be omitted. For example, in operation 911, the second terminal 903 grasps the position of the first terminal 901 and the second terminal 903 using the network information, and after roughly grasping that the two terminals are in proximity, informs the server 905 of the same in operation 913. However, the operations may be skipped. In such case, the server 905 instructs the second terminal 903 to detect the BLE advertisement signal in operation 915 without reporting from the second terminal 903, and in operation 916, the server 905 instructs the first terminal 901 to transmit the BLE advertisement signal.

The embodiment of the present disclosure described above in connection with FIG. 9 may be applicable to when a parent desires to position his/her child. In other words, when the embodiment of FIG. 9 applies to the terminal carried by the parent and the terminal carried by the child, the parent may determine whether the terminal carried by the child is in proximity to the parent's terminal at certain periods.

In this disclosure, the inter-device communication of the BLE advertisement signal as described above applies to doorlock systems.

Figure 10:
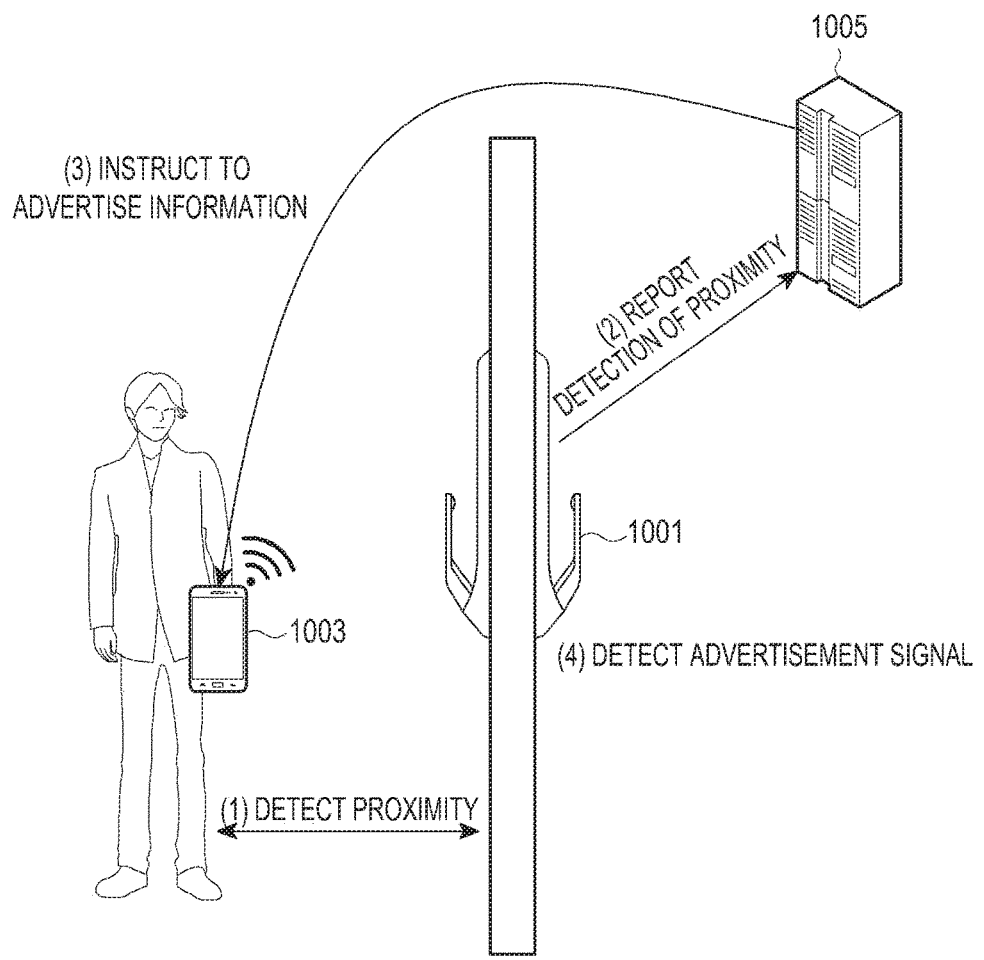
FIG. 10 illustrates a door lock system using a BLE advertisement signal according to an embodiment of the present disclosure.

FIG. 10 illustrates a doorlock system using a BLE advertisement signal according to an embodiment of the second aspect of the present disclosure.

Referring to FIG. 10, the doorlock system includes a doorlock 1001, a terminal 1003 including an electronic key function, and a server 1005.

First, the doorlock 1001 detects that the terminal 1003 is nearby within a certain distance by the above-described various schemes (1). Here, whether the terminal 1003 is in proximity may be detected using a separate sensor provided to the doorlock, e.g., an infrared (IR) sensor or ultrasonic sensor.

The doorlock 1001 transmits a message to the server 1005 to inform that the terminal 1003 is in proximity (2). The server 1005 transmits a message instructing to transmit an advertisement signal to the terminal 1003 (3). Accordingly, the terminal 1003 transmits an advertisement signal including electronic key information, and the doorlock 1001 detects the advertisement signal transmitted from the terminal 1001 and performs connection to the terminal 1003 including the electronic key in order to verify the integrity of the electronic key, and when the electronic key is verified, it releases the doorlock (4). However, such a scheme is also available where the doorlock is released only by receiving the advertisement signal including the electronic key without verifying the electronic key.

As such, by adopting the proximity detecting function and advertisement signal communication scheme for the doorlock, even when the terminal including the electronic key cannot be operated, the doorlock may be released at the minimized terminal power consumption and without the user's additional operation, leading to significantly enhanced user convenience.

Figure 11:
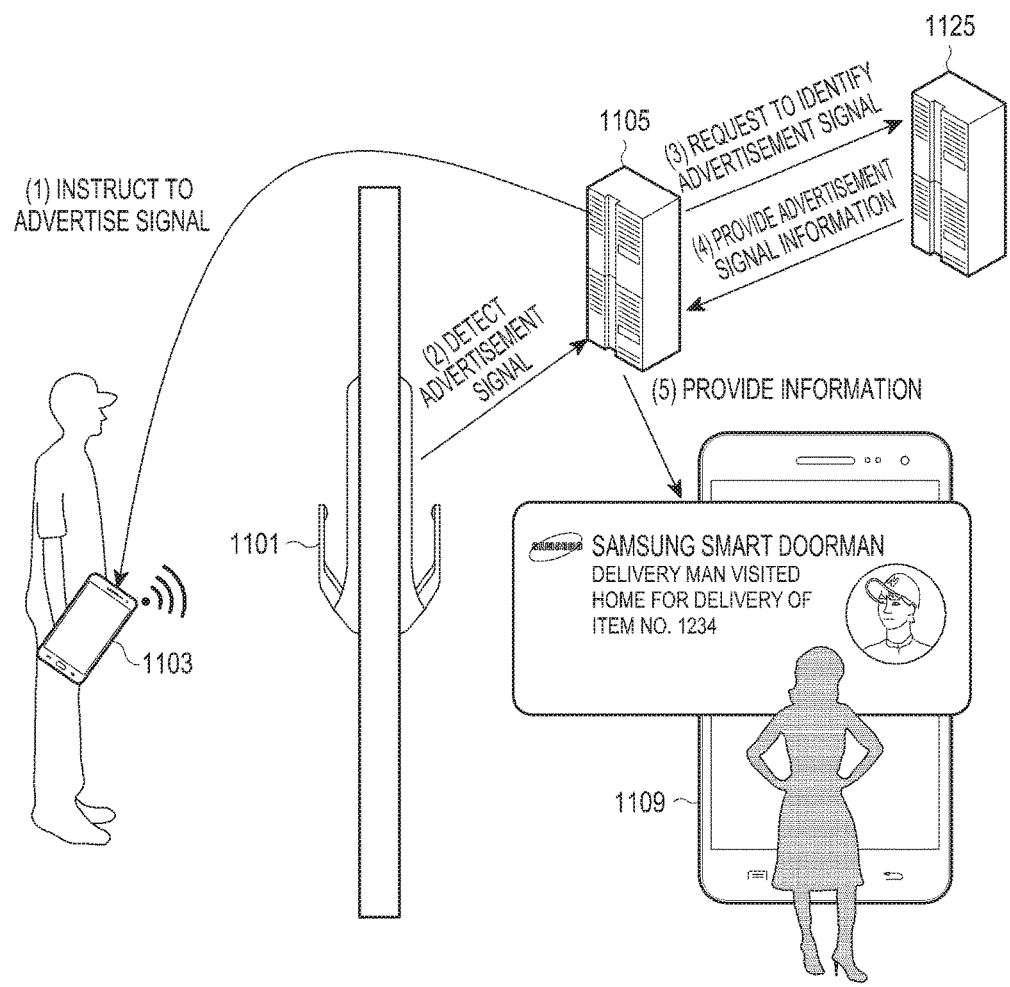
FIG. 11 illustrates a door lock system that may apply to a home visit of a delivery person in a door lock system using a BLE advertisement signal according to an embodiment of the present disclosure.

FIG. 11 illustrates a doorlock system that may apply to a home visit of a delivery person in a doorlock system using a BLE advertisement signal according to an embodiment of the second aspect of the present disclosure.

Referring to FIG. 11, when a terminal 1103 carried by the delivery person informs a company server 1125 of his visit, the delivery company server 1125 instructs the terminal 1103 of the delivery person to transmit an advertisement signal (1). When the delivery person visits the home and his terminal 1103 transmits an advertisement signal, a doorlock 1101 detects the advertisement signal and informs a doorlock server 1105 that the advertisement signal has been detected (2). The doorlock server 1105 requests the delivery company server 1125 to identify the advertisement signal (3), and the delivery company server 1125 transmits a message for identifying that the advertisement signal is the advertisement signal of the delivery person to a doorlock server 1105 (4). When identifying that the advertisement signal is the advertisement signal of the delivery person, the doorlock server 1105 provides a notification of the delivery person's visit to a terminal 1109 of the user who has right to enter the door, e.g., the home owner (5).

Figure 12:
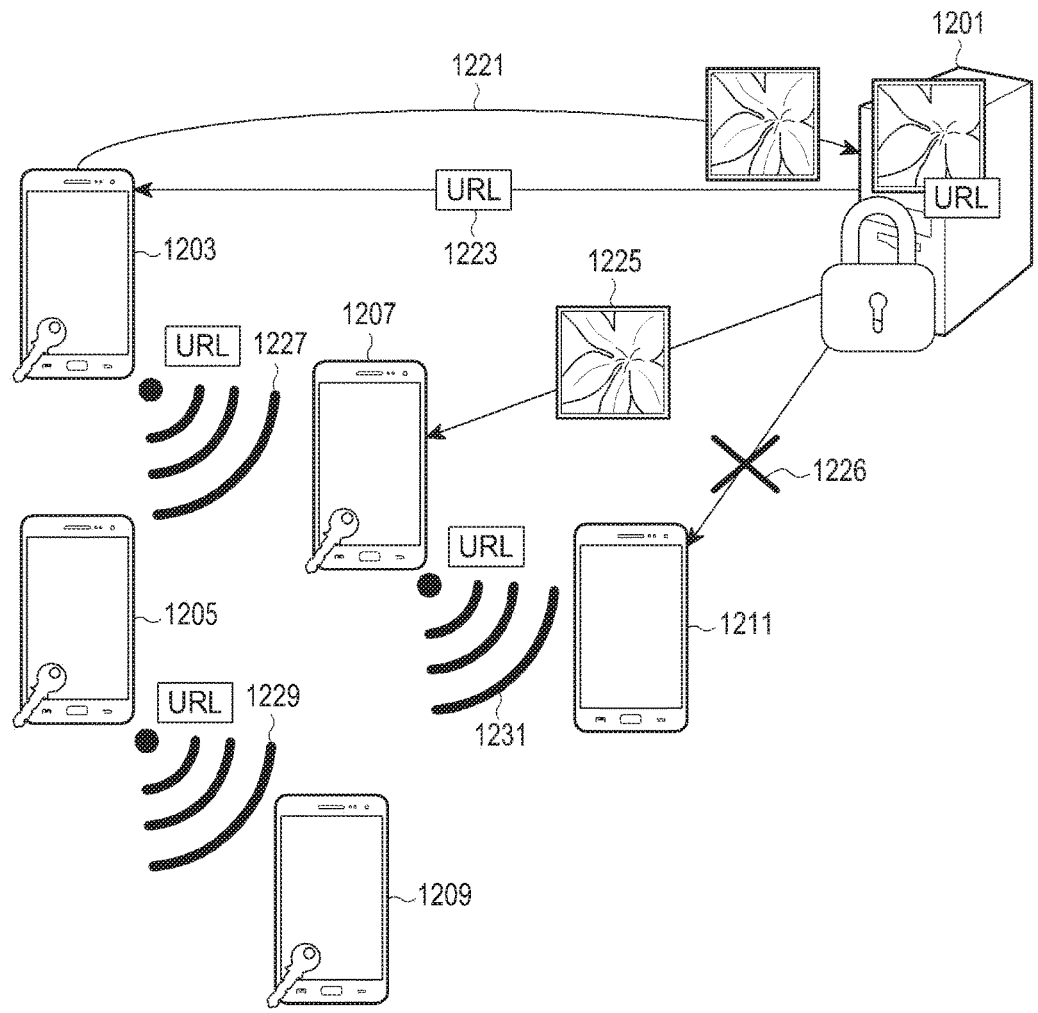
FIG. 12 illustrates a file sharing system communicating files between devices using a BLE advertisement signal according to an embodiment of the present disclosure.

FIG. 12 illustrates a file sharing system communicating files between devices using a BLE advertisement signal according to an embodiment of the second aspect of the present disclosure.

Referring to FIG. 12, it is assumed that terminal 1 1203, terminal 2 1205, terminal 3 1207, and terminal 4 1209 are previously set to be in a group where picture files may be shared. However, terminal 5 1211 does not belong to the sharing group.

Terminal 1 1203 uploads its own picture file to the server 1201 (1221), and the server 1201 transmits the URL information regarding the place where the picture file is stored to terminal 1 1203 (1223). Meanwhile, the server 1201 transmits security keys for downloading the picture file to terminal 1 1203, terminal 2 1205, terminal 3 1207, and terminal 4 1209 belonging to the file sharing group (1225). However, the server 1201 does not transmit the security key to terminal 5 1211 (1226). Each of terminal 1 1203, terminal 2 1205, and terminal 3 1207 transmit a BLE advertisement signal including the URL information where the picture file is stored, in (1227), (1229), and (1231), respectively. Here, the advertisement signal may include group information or terminal identifier information for identifying the particular sharing group.

Terminal 2 1205, terminal 3 1207, and terminal 4 1209 may receive the security key and may use the received security key to download the file stored in the URL of the server 1201. Further, the terminals having received the URL information may transmit advertisement signals including identifier information regarding the receiving group or receiving terminals and the URL information. FIG. 12 illustrates an example in which terminal 2 1205 and terminal 3 1207 advertise the URL information.

Figure 13:
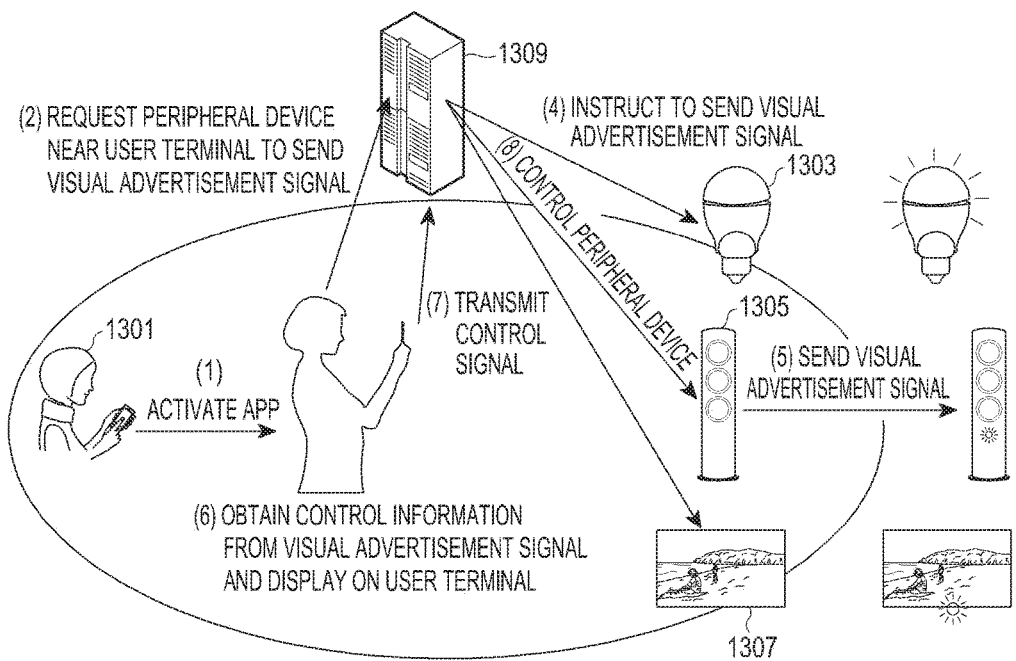
FIG. 13 illustrates an operation of controlling a peripheral device using an advertisement signal from the peripheral device through an application including a camera function in a user terminal according to an embodiment of the second aspect of the present disclosure.

FIG. 13 illustrates an operation of controlling a peripheral device using an advertisement signal from the peripheral device through an application including a camera function in a user terminal according to an embodiment of the second aspect of the present disclosure.

Referring to FIG. 13, first, the user activates a particular application (APP) included in a user terminal 1301 (1). The particular application is assumed to be an application set to control peripheral devices. The particular application includes a camera function and may display an image of a peripheral device to the screen of the user terminal through the camera function. When the user terminal 1301 desires to control the peripheral device displayed through the camera function, the user terminal 1301 requests the server to enable the peripheral device in proximity to the user terminal 1301 to transmit a visual advertisement signal (2). The visual advertisement signal is described below.

A server 1309 identifies the position of the user terminal 1301 in response to the request (3-1) and identifies a peripheral device positioned within a certain radius from the user terminal 1301 (3-2). Further, the server 1309 identifies a peripheral device available by the user terminal 1301 among the peripheral devices (3-3). For reference, the server 1309 may identify the peripheral devices within a certain radius from the user terminal 1301 based on an absolute positioning scheme or relative positioning scheme. Examples of the absolute positioning scheme may include a scheme of using network information, such as a GPS, a Wi-Fi BSSID, a cell ID, and the like, of cellular base station or using a preset geographical radius called geofence, and examples of the relative positioning scheme may include a scheme of setting a reference radius to a distance within a range of detecting a BLE beacon BLE advertisement signal.

Meanwhile, it is assumed in FIG. 13 that the peripheral devices available by the user terminal 1301 include a light 1303, an air conditioner 1305, and a smart TV 1307. The server 1309 transmits instruction messages instructing the identified peripheral devices to advertisement signals (4). Thereafter, the peripheral devices receiving the instruction messages transmits visual advertisement signals (5). An example of such visual advertisement signal may be a signal visually recognized, such as a light flickering signal or quick response (QR) code, and the visual advertisement signal may include coded URL or IP address information storing the information for controlling the peripheral device.

The user terminal 1301 may recognize the visual advertisement signal through the application, obtain the URL information or IP address information by decoding the visual advertisement signal, and obtain the information for controlling the peripheral device from the URL or IP address. The information for controlling may be, e.g., menu information for TV channel shifting or volume up/down. The user terminal 1301 obtains the information for controlling and displays the same to the image of the peripheral device through the application of the user terminal 1301 (6). Thereafter, when the user selects a particular control menu based on the information for controlling the peripheral device, the user terminal 1301 transmits a signal for controlling the peripheral device to the server 1309 (7). The server 1309 may control the peripheral device through the network according to the control signal transmitted from the user terminal (8).

Figure 14:
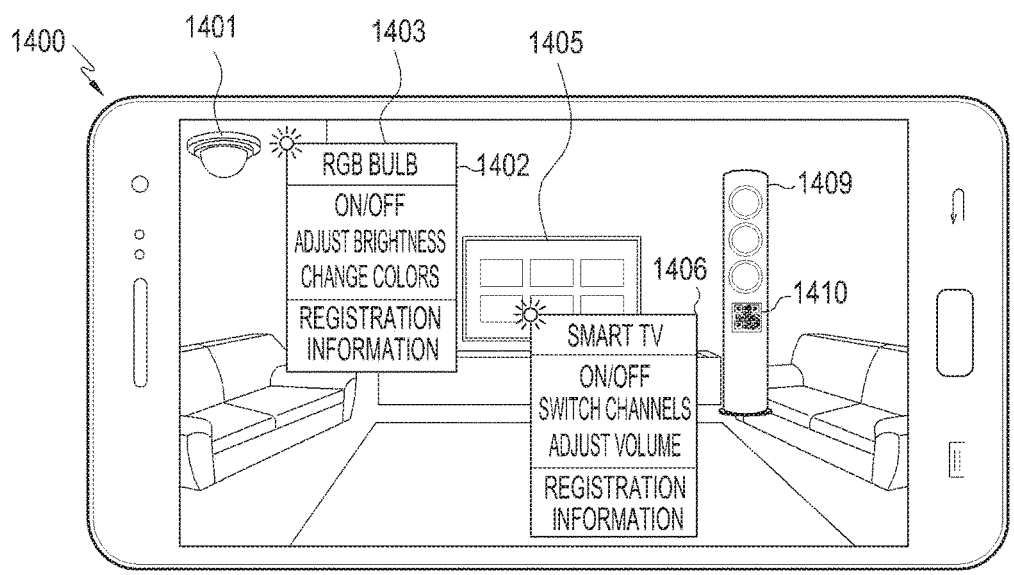
FIG. 14 illustrates an operation of displaying control information for a user terminal to control a peripheral device according to an embodiment of the present disclosure.

FIG. 14 illustrates an operation of displaying control information for a user terminal to control a peripheral device according to an embodiment of the present disclosure.

Referring to FIG. 14, the peripheral devices displayed on the screen of a user terminal 1400 by the camera function of the user terminal 1400 are a light 1401, a smart TV 1405, and an air conditioner 1409, and accordingly, the user terminal 1400 requests the server 1309 to enable the peripheral devices to transmit advertisement signals, and the server 1309 instructs the peripheral devices available by the user terminal 1400 to transmit advertisement signals. Accordingly, the light 1401 and the smart TV 1405 transmit visual advertisement signals in the form of flickering light 1402 and 1406, and the air conditioner 1409 transmits a visual advertisement signal in the form of a QR code 1410, as an example. The visual advertisement signal may include URL information or IP address information coded using the light flickering pattern or QR code. The user terminal 1400 obtaining the URL information or IP address by receiving and decoding the visual advertisement signal obtains the information for controlling each peripheral device from the URL information or IP address. Referring to FIG. 14, the control information is denoted with reference numerals 1403 and 1405. For example, as an example, for the light 1401, the control information 1403 for controlling the light includes ON/OFF of the red, green and blue (RGB) bulb, which is a type of light, brightness adjustment, and color change menu. For the smart TV 1405, the control information 1407 includes, e.g., ON/OFF of the smart TV, channel switching, volume adjustment menu, and the like. The control information may enable the peripheral device to be displayed at a portion where the visual advertisement signal has been generated on the screen of the user terminal 1400, allowing the user to intuitively control the peripheral device when viewing the control information.

Meanwhile, as a variation to the embodiments of the present disclosure shown in FIGS. 13 and 14, upon requiring detailed information related to the contents of a TV program, such as for the smart TV 1405, the visual advertisement signal may be used to transmit control information, and the information on the contents may be additionally transmitted through a signal other than the visual advertisement signal, e.g., a sound signal or BLE advertisement signal.

Figure 15:
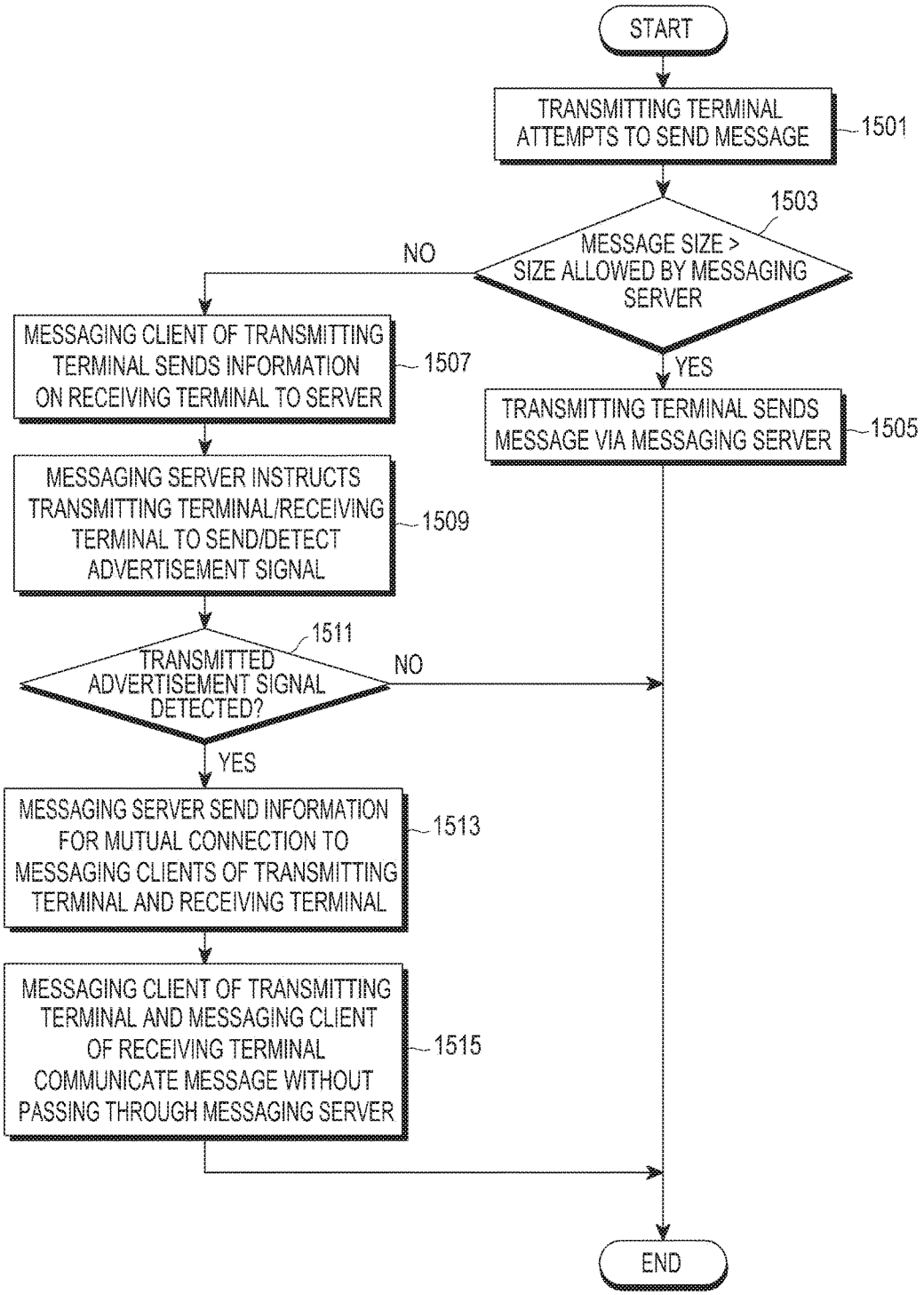
FIG. 15 illustrates a process of differently performing a message communication scheme depending on whether to be in a state of being positioned adjacent in a messaging service according to an embodiment of the present disclosure.

FIG. 15 illustrates a process of differently performing a message communication scheme depending on whether to be in a state of being positioned adjacent in a messaging service according to an embodiment of the present disclosure.

Generally, in the case of a messaging service, such as a messenger, the transmitting terminal and the receiving terminal communicate messages not directly but via a server. Accordingly, a high volume of files cannot be communicated through the messenger. The embodiment of FIG. 15 is related to performing a message service between the transmitting terminal and the receiving terminal without passing through a server when the transmitting terminal and the receiving terminal are in proximity depending on whether an advertisement signal is detected.

Referring to FIG. 15, in operation 1501, the transmitting terminal attempts to transmit a message, and in operation 1503, it is determined whether the size of the message is within a size allowed by the messaging server. When the size of the message is larger than the allowed size, the process goes to operation 1505 in which the transmitting terminal transmits the message via the messaging server following a typical messaging scheme. When the size of the message is larger than the allowed size, the process goes to operation 1507 in which the messaging client of the transmitting terminal transmits information on the receiving terminal (i.e., the identifier information on the receiving terminal) to the server.

In operation 1509, the messaging server instructs the transmitting terminal/receiving terminal to transmit/detect an advertisement signal. For example, the messaging server instructs any one of the transmitting terminal and the receiving terminal to transmit an advertisement signal while instructing the other to detect the advertisement signal.

In operation 1511, when the terminal instructed to detect the advertisement signal detects the advertisement signal, the process goes to operation 1513 in which the messaging server transmits information for mutual connection to the messaging clients of the transmitting terminal and the receiving terminal.

In operation 1515, the messaging client of the transmitting terminal and the messaging client of the receiving terminal perform message communication without passing through the messaging server.

Figure 16:
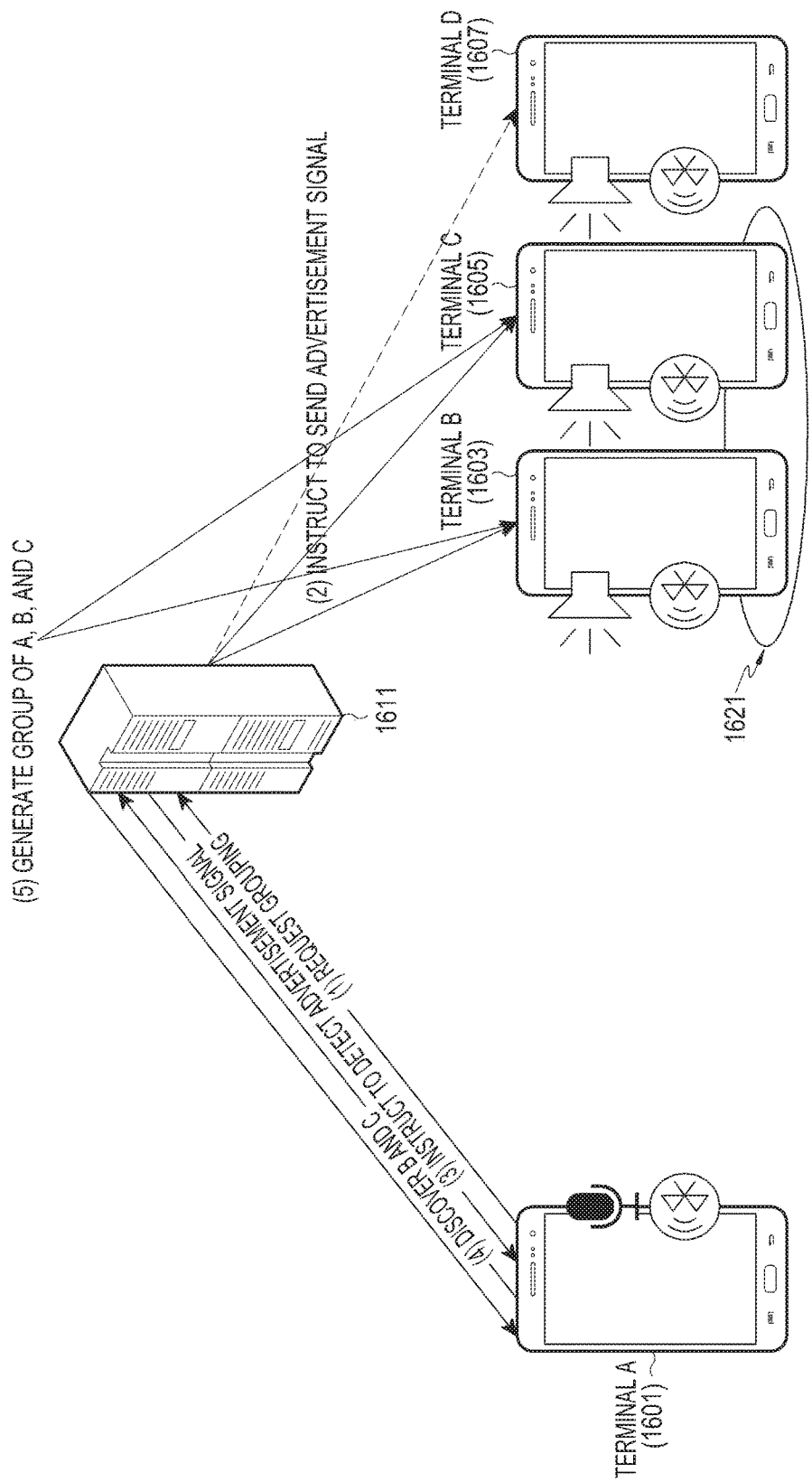
FIG. 16 illustrates an operation of displaying control information for a user terminal to control a peripheral device according to an embodiment of the present disclosure.

FIG. 16 illustrates an operation of displaying control information for a user terminal to control a peripheral device according to an embodiment of the present disclosure.

Referring to FIG. 16, the server requests terminals within a certain region to transmit advertisement signals in order to minimize unnecessary transmission of advertisement signals by the terminals. In this embodiment of the present disclosure, the terminals transmitting advertisement signals and the terminals detecting the advertisement signals are bundled into a single terminal group. A specific operation is as follows.

(1) User terminal A 1601 requests a server 1611 to set a group of user terminals.

(2) The server 1611 instructs terminals within a certain region 1621 to transmit advertisement signals. The terminals present within the certain region 1621 as shown in FIG. 16 are terminal B 1603 and terminal C 1605. It should be noted that terminal D 1607 outside the certain region 1621 might not be instructed to transmit an advertisement signal. This is shown in dotted lines.

When the server 1611, after receiving the request for setting the group from terminal A 1601, requests all of the adjacent terminals to transmit advertisement signals, if terminal D 1607 away from terminal A 1601 transmits an advertisement signal, terminal A 1601 is highly likely to fail to receive the advertisement signal from terminal D 1607. Accordingly, in such case, terminal D 1607 ends up having unnecessarily transmitted the advertisement signal.

In the embodiment of FIG. 16, only terminals positioned within the certain region may be made to transmit advertisement signals in order to prevent unnecessary transmission of advertisement signals. Here, as a scheme for setting the certain region, the distance between the terminals and the transmit power of advertisement signals may be taken into account.

What else may be considered is the importance of the type of data to be communicated by the terminals set to be in group after the communication of the advertisement signals. As an example, when data communication between terminal A 1601 and terminal D 1607 is inevitable, terminal A 1611 may transmit an identifier of terminal D 1607 upon the grouping request, and the server 1611 may request terminal D 1607 to transmit an advertisement signal at the request of terminal A 1601 although terminal D 1607 is present outside the certain region 1621. However, in such case, the server 1611 may request terminal D 1607 to increase the transmit power of the advertisement signal.

(3) Further, the server 1611 instructs terminal A 1601 to detect the advertisement signals transmitted from other terminals.

(4) Terminal A 1601 detects the advertisement signals from terminal B 1603 and terminal C 1605 and provides the result of the detection of the advertisement signals from terminal B 1603 and terminal C 1605 to the server 1611.

(5) The server 1611 receives the detection result and sets terminal A 1601, terminal B 1603, and terminal C 1605 in a single group.

According to the above-described embodiments of the present disclosure, in the case that multiple terminals are expected to obtain the same information due to the same or similar conditions, even when multiple terminals are densely positioned and the network connection is instable, like in a concert hall, or a number of users simultaneously access the information providing server to render it difficult to provide information, a small number of terminals may obtain necessary information and share the information with terminals meeting a certain condition, leading to efficient use of network resources. Further, the user may obtain necessary information without billing for receiving information since he may receive the necessary information through inter-terminal communication without using the network communication with the server for receiving data. Further, information is communicated using lower-power short-range communication, allowing the terminal minimized power consumption.

Further, among a number of terminals, at least one terminal may temporarily be operated as an advertising device while the other terminals are operated as detecting devices. Accordingly, the proximity between terminals may be more precisely determined than when obtaining the location information on a terminal via the GPS or when obtaining the location information through the network using Wi-Fi and cell identifier.

Further, doorlock releasing is possible when desired by the user, with minimized user manipulation of the smart doorlock, and various additional services may be provided to the user through association with other objects, e.g., a reliable visit notification.

Particular aspects of the present disclosure may be implemented in computer-readable codes on a computer-readable recording medium. The computer readable recording medium is a data storage device that may store data readable by a computer system. Examples of the computer readable recording medium may include read only memories (ROMs), random access memories (RAMs), compact disk-read only memories (CD-ROMs), magnetic tapes, floppy disks, optical data storage devices, and carrier waves (such as data transmission over the Internet). The computer readable recording medium may be distributed by computer systems over a network, and accordingly, the computer readable codes may be stored and executed in a distributed manner. Functional programs, codes, and code segments to attain the present disclosure may be readily interpreted by skilled programmers in the art to which the present disclosure pertains.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The apparatuses according to embodiments of the present disclosure may receive the program from a program providing device wiredly or wirelessly connected thereto and store the same. The program providing apparatus may include a memory for storing a program including instructions enabling a program processing apparatus to perform a method according to an embodiment of the present disclosure and data necessary for a method according to an embodiment of the present disclosure, a communication unit for performing wired or wireless communication with a graphic processing apparatus, and a controller transmitting the program to the graphic processing apparatus automatically or as requested by the graphic processing apparatus.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting information in an inter-terminal communication system, the method comprising:
obtaining any information by a terminal;
determining whether the obtained information is shared information; and
transmitting, when the obtained information is the shared information, an advertisement signal including the shared information to another terminal.

2. The method of claim 1, wherein the shared information corresponds to at least one of a certain type of information, information valid for a certain time, or information valid in a certain region.

3. The method of claim 2, wherein the shared information comprises weather information regarding the terminal or location information regarding the terminal.

4. The method of claim 2, wherein the transmitting of the advertisement signal including the shared information comprises advertising within a valid period of the shared information or a valid hop count of the shared information.

5. The method of claim 2, further comprising obtaining the shared information from an information providing server by an information receiver in the terminal.

6. The method of claim 2, further comprising obtaining the shared information from an information providing server via an update information transceiver in the terminal by an information receiver in the terminal.

7. The method of claim 2, further comprising obtaining the shared information transmitted from an update information transceiver of the other terminal via an update information transceiver in the terminal by an information receiver in the terminal.

8. The method of claim 7, wherein a destination domain of a message transmitted from an information receiver in the terminal binds to an internet protocol (IP) address of the update information transceiver in the terminal.

9. The method of claim 7, further comprising:
performing, when the update information transceiver in the terminal receives a request for the shared information from the information receiver, discovery on the advertisement signal;
receiving the advertisement signal including the shared information from the other terminal through the discovery by the update information transceiver in the terminal; and
transferring the received shared information to the information receiver by the update information transceiver in the terminal.

10. The method of claim 7, wherein, when the shared information is larger than a preset size, the shared information is obtained as downsized information.

11. The method of claim 10, wherein a mapping relation between the shared information and the downsized information is obtained from an update identifier manager.

12. The method of claim 2, further comprising:
attempting to receive the shared information from the information providing server within a certain number of times by the information receiver in the terminal; and
attempting to receive, upon failure to obtain the shared information within the certain number of times, the shared information from the other terminal via the update information transceiver in the terminal by the information receiver in the terminal.

13. An apparatus for transmitting information in an inter-terminal communication system, the apparatus comprising:
a controller configured to determine, when a terminal obtains any information, whether the obtained information is shared information; and
a transceiver configured to transmit, when the obtained information is the shared information, an advertisement signal including the shared information to another terminal.

14. The apparatus of claim 13, wherein the shared information corresponds to at least one of a certain type of information, information valid for a certain time, or information valid in a certain region.

15. The apparatus of claim 14, wherein the shared information comprises weather information regarding the terminal or location information regarding the terminal.

16. The apparatus of claim 14, wherein the transceiver is further configured to advertise the shared information within a valid period of the shared information or a valid hop count of the shared information.

17. The apparatus of claim 14, wherein the transceiver is further configured to:
obtain the shared information from an information providing server, and
transfer the obtained shared information to an information receiver in the terminal.

18. The apparatus of claim 14, wherein the transceiver is further configured to:
obtain the shared information from the information providing server, and
transfer the obtained shared information to an information receiver in the terminal via an update information transceiver in the terminal.

19. The apparatus of claim 14, wherein the transceiver is further configured to:
obtain the shared information transmitted from an update information transceiver in the other terminal, and
transfer the obtained shared information to an information receiver in the terminal via an update information transceiver in the terminal.

20. The apparatus of claim 19, wherein a destination domain of a message transmitted from an information receiver in the terminal binds to an internet protocol (IP) address of the update information transceiver in the terminal.

21. The apparatus of claim 19, wherein the update information transceiver in the terminal, when receiving a request for the shared information from the information receiver, is further configured to:
perform discovery on the advertisement signal,
receive an advertisement signal including the shared information from the other terminal through the discovery, and
transfer the received shared information to the information receiver.

22. The apparatus of claim 19, wherein, when the shared information is larger than a preset size, the shared information is obtained as downsized information.

23. The apparatus of claim 22, wherein a mapping relation between the shared information and the downsized information is obtained from an update identifier manager.

24. The apparatus of claim 14, wherein the information receiver in the terminal is further configured to:
attempt to receive the shared information from the information providing server within a certain number of times, and
attempt to receive, upon failure to receive the shared information within the certain number of times, the shared information from the other terminal via the update information transceiver in the terminal.

25. The method of claim 1, wherein the particular information comprises identifier information regarding a wireless fidelity (Wi-Fi) access point (AP) or previously agreed-on information instructing to abstain from performing positioning using a global positioning system (GPS).

26. The apparatus of claim 13, wherein the particular information comprises identifier information regarding a wireless fidelity (Wi-Fi) access point (AP) or previously agreed-on information instructing to abstain from performing positioning using a global positioning system (GPS).

* * * * *